US011627606B2

(12) United States Patent
Hu et al.

(10) Patent No.: US 11,627,606 B2
(45) Date of Patent: Apr. 11, 2023

(54) RECEIVER-ASSISTED LISTEN BEFORE TALK FOR NEW RADIO UNLICENSED SPECTRUM

(71) Applicant: Samsung Electronics Co., Ltd., Gyeonggi-do (KR)

(72) Inventors: Liang Hu, San Diego, CA (US); Jung Hyun Bae, San Diego, CA (US)

(73) Assignee: Samsung Electronics Co., Ltd

(*) Notice: Subject to any disclaimer, the term of this patent is extended or adjusted under 35 U.S.C. 154(b) by 21 days.

(21) Appl. No.: 17/476,940

(22) Filed: Sep. 16, 2021

(65) Prior Publication Data

US 2022/0124806 A1 Apr. 21, 2022

Related U.S. Application Data

(60) Provisional application No. 63/230,441, filed on Aug. 6, 2021, provisional application No. 63/225,750, filed
(Continued)

(51) Int. Cl.
*H04W 74/08* (2009.01)
*H04W 72/04* (2009.01)
(Continued)

(52) U.S. Cl.
CPC ....... *H04W 74/0816* (2013.01); *H04W 16/28* (2013.01); *H04W 72/046* (2013.01);
(Continued)

(58) Field of Classification Search
CPC ............ H04W 74/0816; H04W 16/28; H04W 72/046; H04W 72/1231; H04W 72/1263;
(Continued)

(56) References Cited

U.S. PATENT DOCUMENTS 10,251,201 B2   4/2019 Cheng et al.
11,497,056 B2*  11/2022 Goyal ............... H04B 7/0695
(Continued)

FOREIGN PATENT DOCUMENTS

KR    20200029671 A  *  3/2020
WO    WO-2022080736 A1 *  4/2022

OTHER PUBLICATIONS

Wang et al., "Receiver Assisted LBT Mechanism Design for Beam-based Transmission in Unlicensed Bands," 2020 IEEE/CIC International Conference on Communications in China (ICCC), 2020, pp. 770-775; (Year: 2020).*
(Continued)

*Primary Examiner* — Un C Cho
*Assistant Examiner* — Lalita W Pace
(74) *Attorney, Agent, or Firm* — The Farrell Law Firm, P.C.

(57) ABSTRACT

A user equipment (UE) includes a memory and a processor configured to perform directional listen before talk (LBT) to identify a set of narrow beam and sub-band combinations available for transmission; transmit, to a base station (gNB), at least one schedule request in a physical uplink control channel (PUCCH) over the identified set of narrow beam and sub-band combinations; receive, from the gNB, an uplink grant for physical uplink shared channel (PUSCH) data transmission over at least one narrow beam and sub-band combination selected by the gNB from the identified set of narrow beam and sub-band combinations; and acquire a channel occupancy time (COT) duration for the at least one narrow beam and sub-band combination selected by the gNB as part of the uplink grant.

20 Claims, 14 Drawing Sheets

Related U.S. Application Data on Jul. 26, 2021, provisional application No. 63/137,622, filed on Jan. 14, 2021, provisional application No. 63/134,024, filed on Jan. 5, 2021, provisional application No. 63/092,845, filed on Oct. 16, 2020.

(51) Int. Cl.
| | | |
|---|---|---|
| *H04W 16/28* | (2009.01) | |
| *H04W 74/00* | (2009.01) | |
| *H04W 72/12* | (2023.01) | |
| *H04W 72/044* | (2023.01) | |
| *H04W 72/1263* | (2023.01) | |

(52) U.S. Cl.
CPC ... *H04W 72/1231* (2013.01); *H04W 72/1263* (2013.01); *H04W 74/006* (2013.01)

(58) Field of Classification Search
CPC ........... H04W 74/006; H04W 74/0808; H04W 16/14; H04W 72/0413; H04W 72/1268; H04W 72/14; H04W 74/008
See application file for complete search history.

(56) References Cited

U.S. PATENT DOCUMENTS

| | | | | |
|---|---|---|---|---|
| 2016/0192395 A1* | 6/2016 | Yoo | ...................... | H04W 74/08 370/329 |
| 2018/0343646 A1* | 11/2018 | Chou | ................... | H04W 16/14 |
| 2020/0052803 A1* | 2/2020 | Deenoo | ................ | H04B 17/318 |
| 2020/0100284 A1 | 3/2020 | Li et al. | | |
| 2020/0252806 A1* | 8/2020 | Yerramalli | .......... | H04L 27/0006 |
| 2020/0280859 A1 | 9/2020 | Kim et al. | | |
| 2020/0359411 A1 | 11/2020 | Li et al. | | |
| 2020/0374933 A1 | 11/2020 | Lou et al. | | |
| 2021/0014892 A1* | 1/2021 | Xue | ...................... | H04L 5/0053 |
| 2021/0051676 A1* | 2/2021 | Pezeshki | ............. | H04W 72/082 |
| 2021/0092769 A1 | 3/2021 | Koorapaty et al. | | |
| 2021/0378011 A1* | 12/2021 | Luo | ................... | H04W 72/0426 |
| 2022/0039163 A1* | 2/2022 | Park | ...................... | H04L 5/0048 |
| 2022/0046709 A1* | 2/2022 | Damnjanovic | ....... | H04W 16/14 |

OTHER PUBLICATIONS

Lagen et al., "New Radio Beam-Based Access to Unlicensed Spectrum: Design Challenges and Solutions," IEEE Communications Surveys & Tutorials, vol. 22, No. 1, pp. 8-37, Firstquarter 2020. (Year: 2020).*
3GPP TSG RAN WG1 Meeting #103-e, e-Meeting, Oct. 26-Nov. 13, 2020, 38.808 TR Text Proposal Discussion.
ETSI EN 302 567 V2.1.1, Multiple-Gigabit/s radio equipment operating in the 60 GHz band; Harmonised Standard covering the essential requirements of article 3.2 of Directive 2014/53/EU, Jul. 2017.
3GPP TSG RAN Rel-18 workshop, Electronic Meeting, Jun. 28-Jul. 2, 2021, Views on eMBB-driven Functional Evolution for Rel-18.

* cited by examiner

RECEIVER-ASSISTED LISTEN BEFORE TALK FOR NEW RADIO UNLICENSED SPECTRUM

PRIORITY

This application is based on and claims priority under 35 U.S.C. § 119(e) to U.S. Provisional Patent Application Ser. Nos. 63/092,845, filed on Oct. 16, 2020; 63/134,024, filed on Jan. 5, 2021; 63/137,622, filed on Jan. 14, 2021; 63/225,750, filed on Jul. 26, 2021; and 63/230,441, filed on Aug. 6, 2021, the entire contents of each of which are incorporated herein by reference.

FIELD

The present disclosure is generally related to improving new radio (NR) wireless communication by employing receiver-assisted listen before talk (LBT) transmission schemes in high frequency bands.

BACKGROUND

The third Generation Partnership Project (3GPP) has developed fifth generation (5G) NR standards for wireless communication licensed bands. Presently, however, 3GPP standardization of unlicensed bands in the 52.6-71 gigahertz (GHz) bandwidth (BW) is being developed.

To perform wireless communication on unlicensed bands, highly directional antennas may be used to compensate for high path loss. Highly directional antennas, however, may be subject to interference caused by a hidden node problem, an exposed node problem, or other wireless interference problems.

Thus, a channel access procedure may be performed prior to transmitting data packets to sense a channel for wireless communication. The channel access procedure including the channel sensing procedure may be an LBT procedure and detect energy levels of sub-bands to identify an optimal channel for transmission. In addition, the channel sensing procedure may specify omni-directional LBT, directional LBT and receiver assistance for channel access.

In the unlicensed BW spectrum, LBT is typically performed by the transmitter before transmitting data packets to protect ongoing transmission from other devices. In this manner, channel sensing occurs at the transmitter only. While this approach may be useful in some respects, it may miss certain interference sources (e.g., interference caused by the hidden node problem or the exposed node problem).

At high frequencies, with the use of highly directional antennas and large beamforming gains, the transmitter may fail to account for some sources of interference (e.g., if the antennas are not aligned). For example, interference resulting from the hidden node problem may be amplified due to the transmitter's inability to detect interference at the receiver. Also, the exposed node problem may cause the transmitter to detect tolerable, or otherwise harmless, interference.

Thus, an approach is needed to reduce communication interference in unlicensed bands.

SUMMARY

The present disclosure has been made to address the above-mentioned problems and disadvantages, and to provide at least the advantages described below.

In accordance with an aspect of the present disclosure, a UE is provided. The UE includes a memory and a processor configured to perform directional LBT to identify a set of narrow beam and sub-band combinations available for transmission; transmit, to a base station (gNB), at least one schedule request in a physical uplink control channel (PUCCH) over the identified set of narrow beam and sub-band combinations; receive, from the gNB, an uplink grant for physical uplink shared channel (PUSCH) data transmission over at least one narrow beam and sub-band combination selected by the gNB from the identified set of narrow beam and sub-band combinations; and acquire a channel occupancy time (COT) duration for the at least one narrow beam and sub-band combination selected by the gNB as part of the uplink grant.

In accordance with another aspect of the present disclosure, a UE is provided. The UE includes a memory and a processor configured to perform directional LBT to identify a set of narrow beam and sub-band combinations available for transmission; transmit, to a gNB, at least one request to send (RTS) message in a PUCCH over the identified set of narrow beam and sub-band combinations; receive, from the gNB, a downlink control information (DCI) message over at least one narrow beam and sub-band combination selected by the gNB from the identified set of narrow beam and sub-band combinations; and in response to receiving the DCI message, acquire a COT duration for the at least one narrow beam and sub-band combination selected by the gNB.

In accordance with another aspect of the present disclosure, a gNB is provided. The gNB includes a memory and a processor configured to perform directional LBT to identify a set of narrow beam and sub-band combinations available for transmission; transmit, to a UE, DCI in a PDCCH over the identified set of narrow beam and sub-band combinations; receive, from the UE, an interference measurement for at least one narrow beam and sub-band combination included in the set of narrow beam and sub-band combinations; select a final narrow beam and sub-band combination included in the set of narrow beam and sub-band combinations based on the interference measurement; and acquire a COT duration for data transmission for the selected final narrow beam and sub-band combination.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
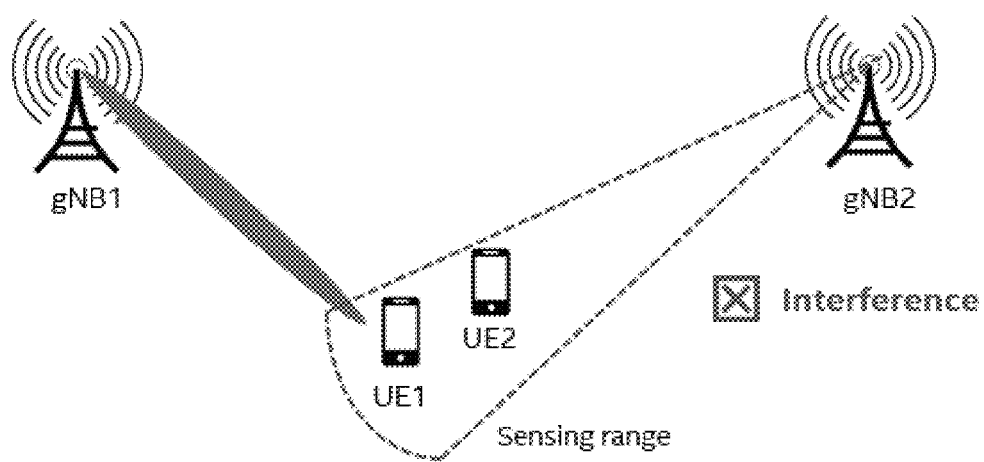
FIG. 1 illustrates a diagram of the hidden node problem with directional LBT, according to an embodiment.

The present application introduces receiver-assisted LBT protocols to account for specific characteristics of the band (e.g., an unlicensed band for the 52.6-71 GHz BW), such as higher path loss or the effects of directional antennas.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to an embodiment, the present disclosure provides techniques to improve the performance of an NR unlicensed 60 GHz system to cope with and/or mitigate interference caused by, for example, the hidden node problem and/or exposed node problem.

FIG. 1 illustrates a diagram of the hidden node problem with directional LBT, according to an embodiment.

Referring to FIG. 1, gNB1 may wirelessly transmit data to UE1 by narrow beam transmission while gNB2 transmits data to UE2. Although gNB1 may perform conventional LBT (e.g., transmission-side LBT), gNB1 may not be able to detect interference caused by gNB2's wireless communication with UE2. For example, the likelihood of interference may be heightened if gNB1 is performing narrow beam transmission and gNB1 is performing another type of transmission. Narrow beam transmission may have a relatively high gain compared to other transmission types, which may increase the likelihood of interreference. Therefore, the present disclosure proposes various configurations to enable a receiver, such as UE1, to perform measurements and supply information regarding the measurements to a transmitter, such as gNB1, or other network devices, to reduce interference caused by gNB2, or other network devices.

To accomplish this, the present disclosure provides configurations for receiver-assisted LBT in the downlink and uplink for both a dynamic grant and a configured grant; modification of the contention window adjustment scheme to include receiver-assisted LBT; transmitted behaviors for COT sharing with receiver-assisted LBT; receiver-assisted LBT with multi-beam transmissions.

An LBT configuration may be used as a mechanism to assess whether a channel is available for transmitting data. If a channel is identified as being available, then the LBT may be deemed a "successful" LBT. In some jurisdictions, LBT, or a similar procedure, may be mandated by regulation to be performed for unlicensed bands.

LBT may be used to initiate a COT by a UE, a gNB, or another network device, using LBT schemes. For example, Cat 2 LBT (e.g., one-shot LBT or short LBT) may be a channel-access procedure in which a network device initiates a transmission after sensing a channel (e.g., performing a clear channel assessment (CCA)) to be idle for a predetermined duration (e.g., 25 microseconds).

Additionally, Cat 4 LBT (e.g., long LBT) may employ a back-off timer and a variable contention window size. If a channel is sensed to be available via a CCA, a transmitter may generate a random number among a uniform distribution from (0, CW) where CW is the maximum contention window size. The random number may represent a back-off timer, as a minimum number of slots must be sensed to be idle before data can be transmitted on the channel. As will be discussed, the contention window size may vary according to whether or not data transmissions are successful.

According to an embodiment, in a wireless network environment a carrier BW may be divided into a set of LBT sub-bands denoted as B1, B2, B3, . . . Bn. The sub-bands may be based on a basic LBT BW unit (e.g., at 5 GHz carrier frequency, the basic LBT BW unit may equal 20 MHz BW). A set of narrow beams between each UE and its serving BS with the strongest measured reference signal received power (RSRP) values may be set as the outcome of the beam management. The set of the narrow beams may be defined by a set of transmission configuration indicator (TCI) states denoted by T1, T2, T3, . . . Tn.

Figure 2:
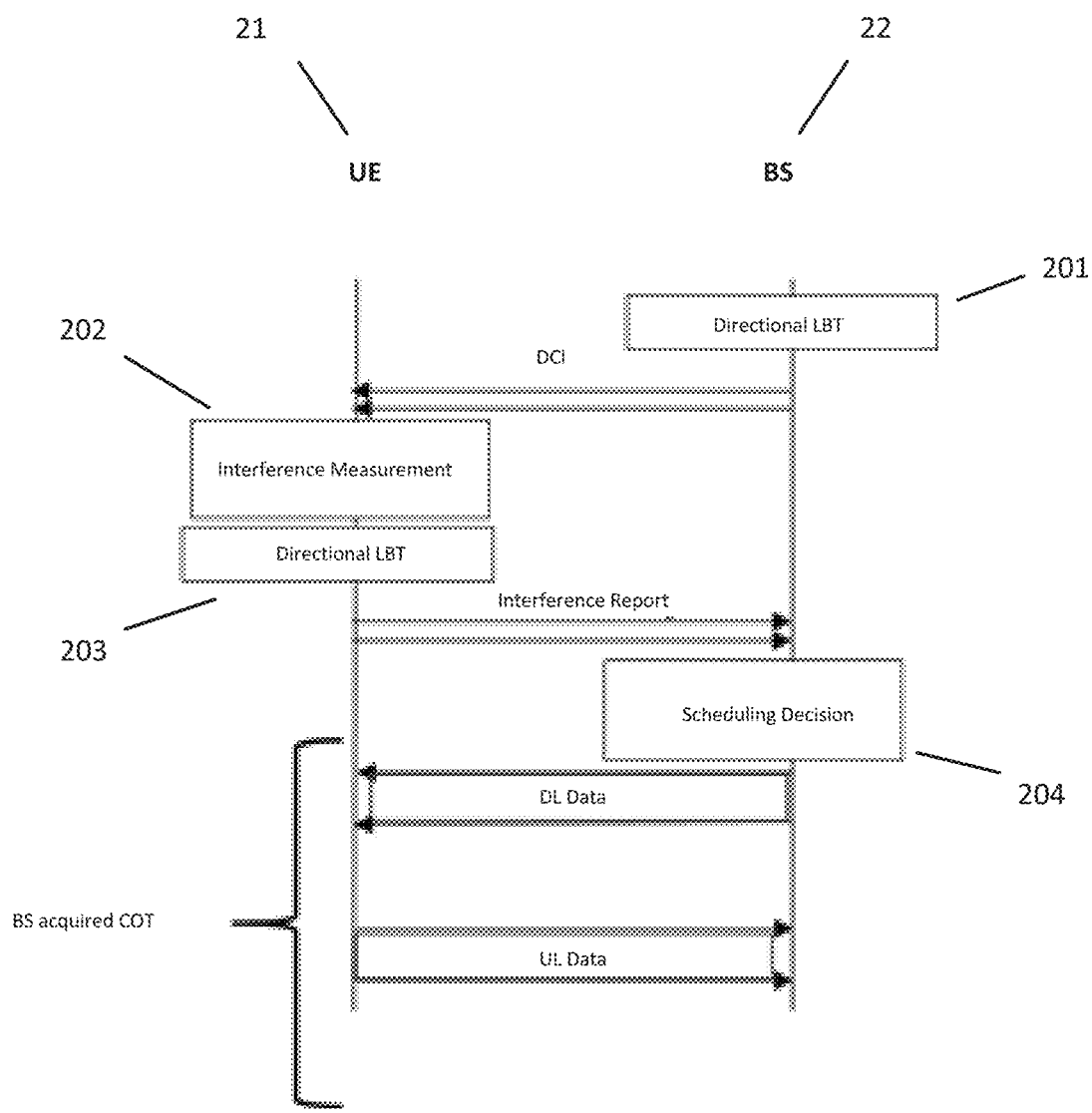
FIG. 2 illustrates a dynamic grant receiver-assisted LBT configuration in the downlink, according to an embodiment.

FIG. 2 illustrates a dynamic grant receiver-assisted LBT configuration in the downlink, according to an embodiment.

Referring to FIG. 2, UE 21 is acting as the receiver and BS 22 is acting as the transmitter.

In step 201, BS 22 performs directional long LBT in each of the combinations (Bi, Ti) for downlink transmission to a specific UE 21. Bi is one of the sub-bands from (B1, B2, B3, . . . Bn), and Ti is one of the narrow beams from (T1, T2, T3, . . . Tn).

Alternatively, BS 22 may not need to perform long LBT in some conditions, such as if a regulation does not mandate LBT before transmission. In addition, BS 22 may only need to perform one shot LBT with a fixed time duration before transmissions over one of the narrow beams from (T1, T2, T3, . . . Tn), if the BS 22 is sharing the beam-based COT with previous uplink transmissions where the beam is quasi co-located (QCLed) type D with one of the narrow beams from (T1, T2, T3, . . . Tn).

BS 22 sends one or more sets of DCI to UE 21, each of which is sent over one or multiple combinations of (Bi, Ti) that have passed the CCA performed by BS 22 (e.g., if long LBT is successful). In one embodiment, a single DCI can indicate the clearance of multiple (Bi, Ti)'s at the BS 22 transmitter side after a successful LBT over the multiple (Bi, Ti)'s. Each physical downlink control channel (PDCCH) may carry a unique DCI including the frequency and time resource allocation of the physical downlink shared channel (PDSCH) in the sub-band. The DCI may also contain the frequency and time resource for UE 21 to make interference measurements (e.g., a channel state information interference measurement (CSI-IM)). The DCI may also be configured to include the frequency and time resources for UE's 21 interference measurement report.

UE 21 may simultaneously monitor a set of CORESETs for PDCCH receptions, whose spatial relationships are defined by (T1, T2, T3, . . . Tn).

In step 202, upon receiving one or multiple PDCCH's from BS 22, whose TCI states are denoted by (Tj, . . . Tk) and sub-bands are denoted by (Bj, . . . Bk), UE 21 performs interference measurements for the combinations (Tj, Bj), (Tk, Bk) . . . (Tj, Bk), (Tk, Bj), which have been cleared by the BS 22 transmitter's LBT. For example, interference measurements can be done based on a reference signal received quality (RSRQ) measurement or a RSRP measurement of the configured CSI-IM resources based on the combinations of sub-band and directional beams, or using a layer 1 (L1) received signal strength (RSSI) measurement based on the combination of the sub-band and directional beam.

In step 203, UE 21 performs directional short LBT (e.g., Cat 2 LBT) or long LBT (e.g., Cat 4 LBT) on each combination (Tj, Bj), (Tk, Bk), (Tj, Bk), and (Tk, Bj). In response to a successful LBT, UE 21 sends a copy of the interference measurement report of the combinations (Tj, Bj), (Tk, Bk), (Tj, Bk), and (Tk, Bj) to BS 22 via uplink control information (UCI) over a PUSCH using one of the combinations (Tj, Bj), (Tk, Bk), (Tj, Bk), and (Tk, Bj). If multiple LBT's are successful, one or multiple copies of the interference reports may be sent to BS 22.

Optionally, the interference reports can be sent to BS 22 without performing any directional LBT in step 203. Alternatively, the UE 21 may not send any interference reports to the BS 22, and instead send just one UCI via a PUCCH to the BS 22 once the LBT is successful for each of (Tj, Bj), (Tk, Bk), (Tj, Bk), (Tk, Bj). In addition, the PUCCH resource carrying the UCI should be indicated in the DCI.

Upon receiving the one or more interference reports or UCI from UE 21, in step 204, BS 22 makes a centralized scheduling decision. For example, the BS 22 may decide whether to schedule this UE 21 or not. If yes, the BS 22 may make a final selection of a combination sub-band and narrow beam (and the corresponding DCI) for UE PDSCH reception, considering the overall spectrum efficiency and traffic quality of service (QoS) requirements. In response to a successful short LBT procedure on the selected sub-band and narrow beam, or without any LBT, BS 22 sends data to the UE 21 over the frequency and time resources in the selected sub-band and narrow beam. In an extreme case, BS 22 may not select any sub-band and narrow beam, and start a back-off timer to re-attempt transmission after the timer expires according to the long LBT procedure.

After the scheduling decision, the UE 21 simultaneously monitors potential PDSCH receptions over an entire set of or a subset of the combinations (Tj, Bj), (Tk, Bk), (Tj, Bk), and (Tk, Bj), and the UE 21 may receive data over the PDSCH via one of the sub-band and narrow beam combinations. In an extreme case, the UE 21 may not receive any data from any of the monitored PDSCH's, if the UE 21 is not scheduled by the BS 22.

In addition, according to an embodiment, the interference measurement and reporting described with regards to steps 202 and 203, above, may be further enhanced.

NR Release (Rel)-15 and 16 support aperiodic CSI reporting on a PUSCH. The gNB (e.g., a BS) may pre-configure the UE with a list of aperiodic trigger states, where each trigger state is linked to one or more associated report configurations. Each report configuration may contain a CSI report configuration ID and specify a set of CSI-RS resource sets for channel measurement and, optionally, for interference measurement. An aperiodic CSI may be triggered by an uplink grant DCI (e.g., DCI Format 0_1 or 0_2). The CSI request value in triggering DCI may point to one of the trigger states in the pre-configured aperiodic trigger state list. When the UE detects an uplink grant DCI with a valid CSI request value, the UE may perform channel and optional interference measurement based on the CSI resource sets specified in the pre-configured associated report configuration, compute CSI-related, L1-RSRP-related or L1-signal to interreference ratio (SINR)-related quantities as specified in the CSI report configuration, and transmit a CSI report on the PUSCH resource scheduled by the uplink grant DCI. However, as described below, NR Rel-15 and 16 aperiodic CSI reporting can be enhanced to better support receiver interference measurement and reporting (e.g., corresponding to steps 202-203 of FIG. 2).

According to an embodiment, a beam-based L1 RSSI may be added to report quantity. For receiver-assisted LBT in an unlicensed band, a new L1 quantity report of L1-RSSI may be used so that the receiver (e.g., UE 21) can measure and report one or more interference levels in terms of received signal strength. The measurement of L1-RSSI can be based on "empty" radio resources (e.g., orthogonal frequency division multiplexing (OFDM) resources and physical resource block (PRB) resources) that are reserved for RSSI measurement (e.g., based on zero power channel state information (CSI) reference signals or based on CSI interference measurements). The UE may perform L1 RSSI measurement on the combination of the sub-band and directional beams indicated by the gNB (e.g., BS 22) as described in step 202, above, and the combination of the sub-band and directional beams may be indicated in the DCI as described above.

In particular, a new set of CSI report configuration IDs may be defined to specify a set of CSI interference measurement resource sets for L1 RSSI interference measurements. Alternatively, a new set of PDSCH configurations with zero power-CSI-reference signal resource sets for L1 RSSI may be defined for interference measurements. The new defined set of CSI report configurations or PDSCH configurations may also include the PUCCH resources used for reporting.

According to an embodiment, aperiodic CSI may be reported via a PUCCH. In NR Rel-15 and Rel-16, aperiodic CSI reporting can only be triggered by uplink grant DCIs and the CSI report can only be transmitted on a PUSCH. However, this requires a relatively large amount of resources, and a single DCI may advantageously be used to schedule the measurement report or UCI via PUCCH (in case no measurement is needed) and downlink PDSCH transmissions.

Accordingly, triggering aperiodic CSI or UCI via a PUCCH by a modified legacy PDSCH scheduling DCI (e.g., DCI format 1_1 and 1_2) is proposed. Additionally, the triggered aperiodic CSI report may be carried by a PUCCH.

To accomplish this improved triggering configuration, the DCI format 1_1 and 1_2 may be modified to add the CSI request field to report the transmission of an L1-RSSI measurement report, as described above, similar to the CSI request field in the uplink scheduling DCI. In addition, the aperiodic CSI may be triggered by the modified DCI Format 1_1 or 1_2. The DCI may carry a CSI request for aperiodic L1-RSSI measurements, pointing to a pre-configured aperiodic CSI trigger state for aperiodic L1-RSSI measurements. Additionally, the CSI report may be transmitted on a PUCCH. The PUCCH resource for CSI report transmission can be specified by CSI-ReportConfig.

Alternatively, if the measurement resources are a zero power-CSI-reference signal, then the new PDSCH-configurations for the L1-RSSI measurement can be defined and triggered by the "ZP CSI-RS" field in DCI 1_1.

According to an embodiment, if there is no RSSI interference measurement at the UE, the UCI may be sent back to the BS to provide assistance information. A new UCI format similar to legacy UCI format 0 can be employed to carry UE assistance information to the BS, due to its similar functionality as HARQ. Since the UE assistance information should be provided to the BS in a timely manner, the long PUCCH format is not preferred (e.g., UCI format 1).

Figure 3:
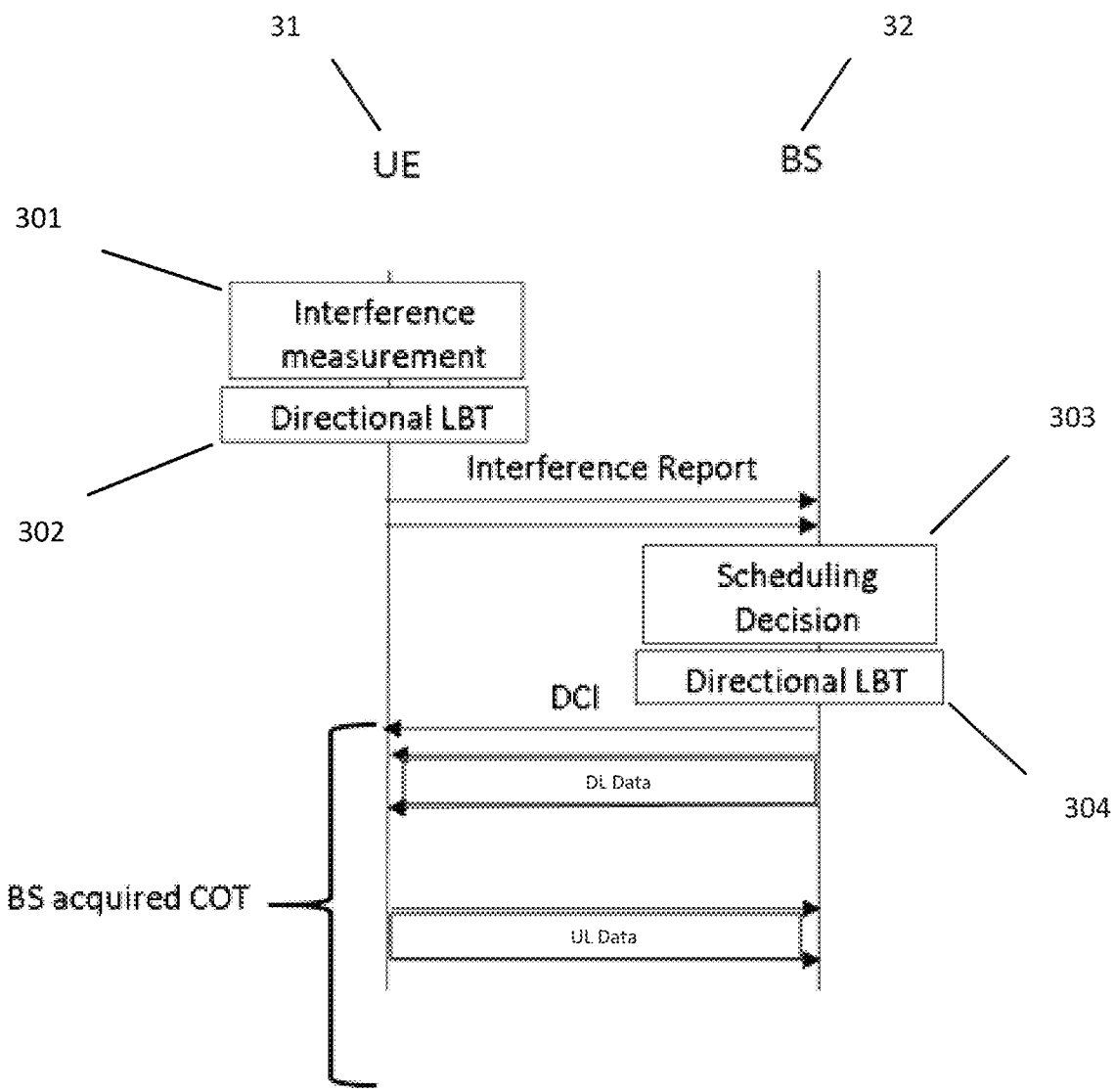
FIG. 3 illustrates a dynamic grant receiver-assisted LBT configuration in the downlink, according to an embodiment.

FIG. 3 illustrates a dynamic grant receiver-assisted LBT configuration in the downlink, according to an embodiment.

Referring to FIG. 3, UE 31 is acting as the receiver and BS 32 is acting as the transmitter.

The UE 31 may be radio resource control (RRC) configured by BS 32 to make periodical measurements on each of the combinations (Bi, Ti). Bi is one of the sub-bands from (B1, B2, B3, Bn), and Ti is one of the narrow beams from (T1, T2, T3, . . . Tn). In addition, a measurement frequency and time resources may also be RRC configured by BS 32.

In step 301, UE 31 performs an interference measurement. The interference measurement step 301 may be similar to step 202 in FIG. 2.

In step 302, UE 31 performs directional LBT. The directional LBT step 302 may be similar to step 203 in FIG. 2.

After performing long LBT in step 302, UE 31 reports the interference measurement as an interference report to BS 22 periodically via PUSCH resource(s), which may also be RRC configured by BS 22.

Once the interference report is received from UE 31, BS 32 makes a centralized scheduling decision in step 303. The scheduling decision in step 303 may be similar to step 204 in FIG. 2. For instance, the scheduling decision may include deciding whether to schedule this particular UE 31 or not. If yes, BS 32 may make a final selection of the sub-band and narrow beam (and the corresponding DCI) for UE 31 PDCCH and PDSCH reception, considering the overall spectrum efficiency and traffic QoS requirements. In response to a successful short LBT procedure in step 304, BS 32 sends DCI and downlink data to the UE 31 over the frequency and time resources in the selected sub-band and narrow beam. In an extreme case, BS 32 may not select any sub-band and narrow beam, resulting in re-attempting transmission in the future according to the long LBT procedure.

UE 31 may simultaneously monitor a set of CORESETs for PDCCH and PDSCH receptions, whose spatial relationships are defined by (T1, T2, T3, . . . Tn). In an extreme case, UE 31 may not receive any data from any of the monitored PDSCH(s).

Figure 4:
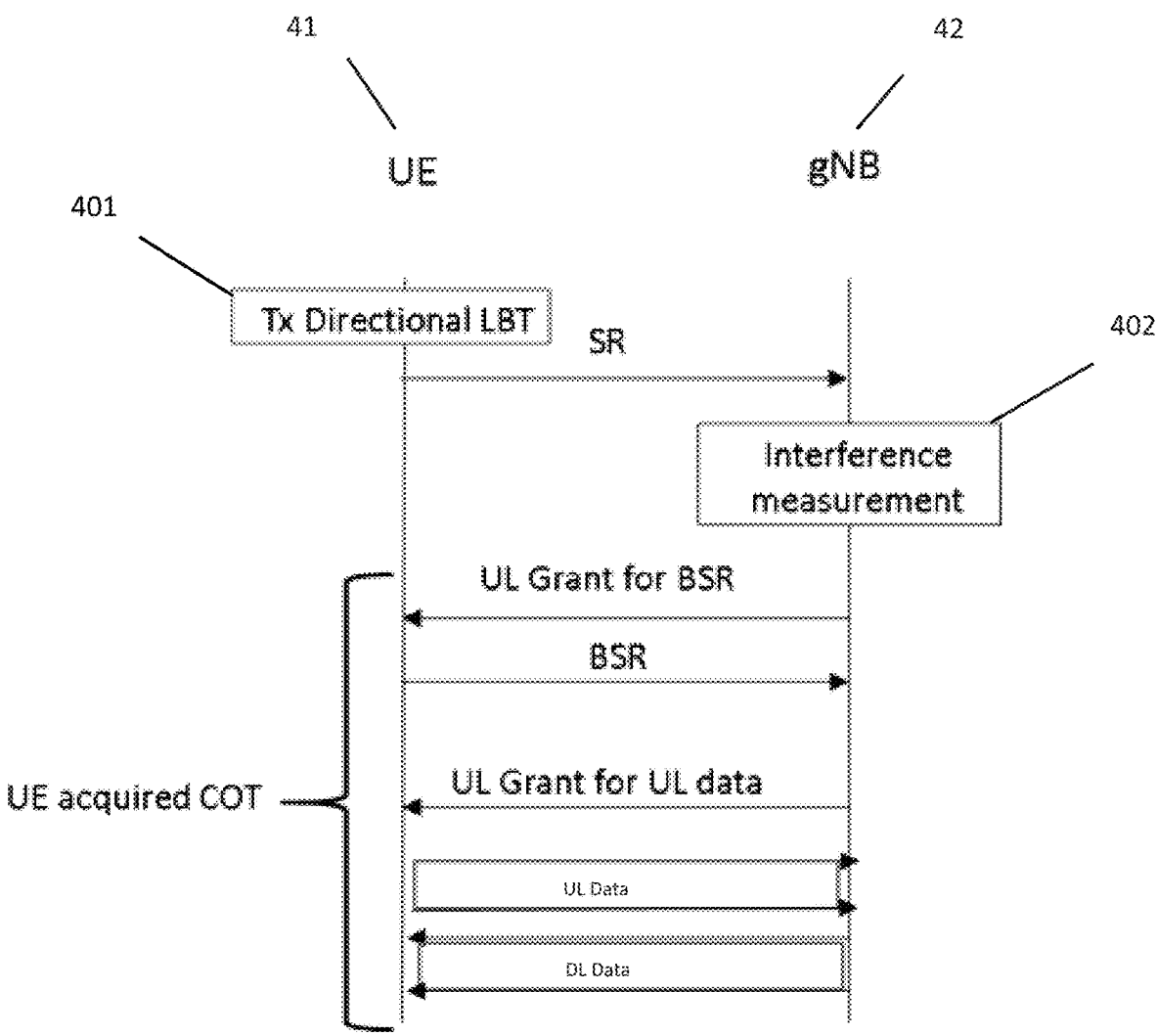
FIG. 4 illustrates a dynamic grant receiver-assisted LBT configuration in the uplink, according to an embodiment.

FIG. 4 illustrates a dynamic grant receiver-assisted LBT configuration in the uplink, according to an embodiment.

Referring to FIG. 4, gNB 42 (e.g., a base station (BS)) is acting as the receiver and UE 41 is acting as the transmitter.

In step 401, UE 41 performs transmission-side directional LBT (e.g., long LBT) for each of the combinations (Bi, Ti). Bi is one of the sub-bands from (B1, B2, B3, . . . Bn), and Ti is one of the narrow beams from (T1, T2, T3, . . . Tn). Then, if the LBT is successful, UE 41 sends one or more schedule requests (SRs) in a PUCCH over one or more narrow beams and sub-bands identified by the directional LBT in step 401. Alternatively, UE 41 may not need to perform long LBT at all in some conditions, such as if a regulation does not mandate LBT before transmission. In addition, UE 41 may only need to perform one shot LBT (instead of long LBT) with a fixed time duration before transmissions over one of the narrow beams from (T1, T2, T3, . . . Tn), if the gNB 42 is sharing the beam-based COT with previous downlink transmissions where the beam is QCLed type D with one of the narrow beams from (T1, T2, T3, . . . Tn).

In step 402, upon receiving one or more SRs, gNB 42 performs interference measurements on the received sub-bands and narrow beams. gNB 42 makes a centralized scheduling decision. For example, the scheduling decision may be whether or not to schedule this particular UE 41. If this particular UE 41 is to be scheduled, the gNB 42 makes the final selection of the sub-band and narrow beam (and the corresponding uplink grant) for UE PUSCH transmission, considering the overall spectrum efficiency and traffic QoS requirements. In an extreme case, gNB 42 may not select any sub-band and narrow beam, and an uplink grant may not be sent to UE 41.

gNB 42 may perform directional short LBT (e.g., Cat 2 LBT) or long LBT (e.g., Cat 4 LBT) on each of (Tj, Bj), (Tk, Bk), (Tj, Bk), (Tk, Bj). In response to the directional short LBT being successful, gNB 42 sends an uplink grant for buffer status reporting (BSR) via a PDCCH in the selected sub-band or narrow beam. Optionally, this uplink grant can be sent to UE 41 without performing any LBT.

In response to receiving the uplink grant for BSR, UE 41 acquires a COT duration for the narrow beam and sub-band selected by gNB 42. Uplink and downlink transmissions within the COT may be based on short LBT (e.g., Cat 2 LBT) or no LBT. COT information can be conveyed from UE 41 to gNB 42 as part of BSR or as dedicated UCI information. If UE 41 does not receive any uplink grant for BSR, UE 41 may perform initiate a back-off timer according to a long LBT procedure.

Figure 5:
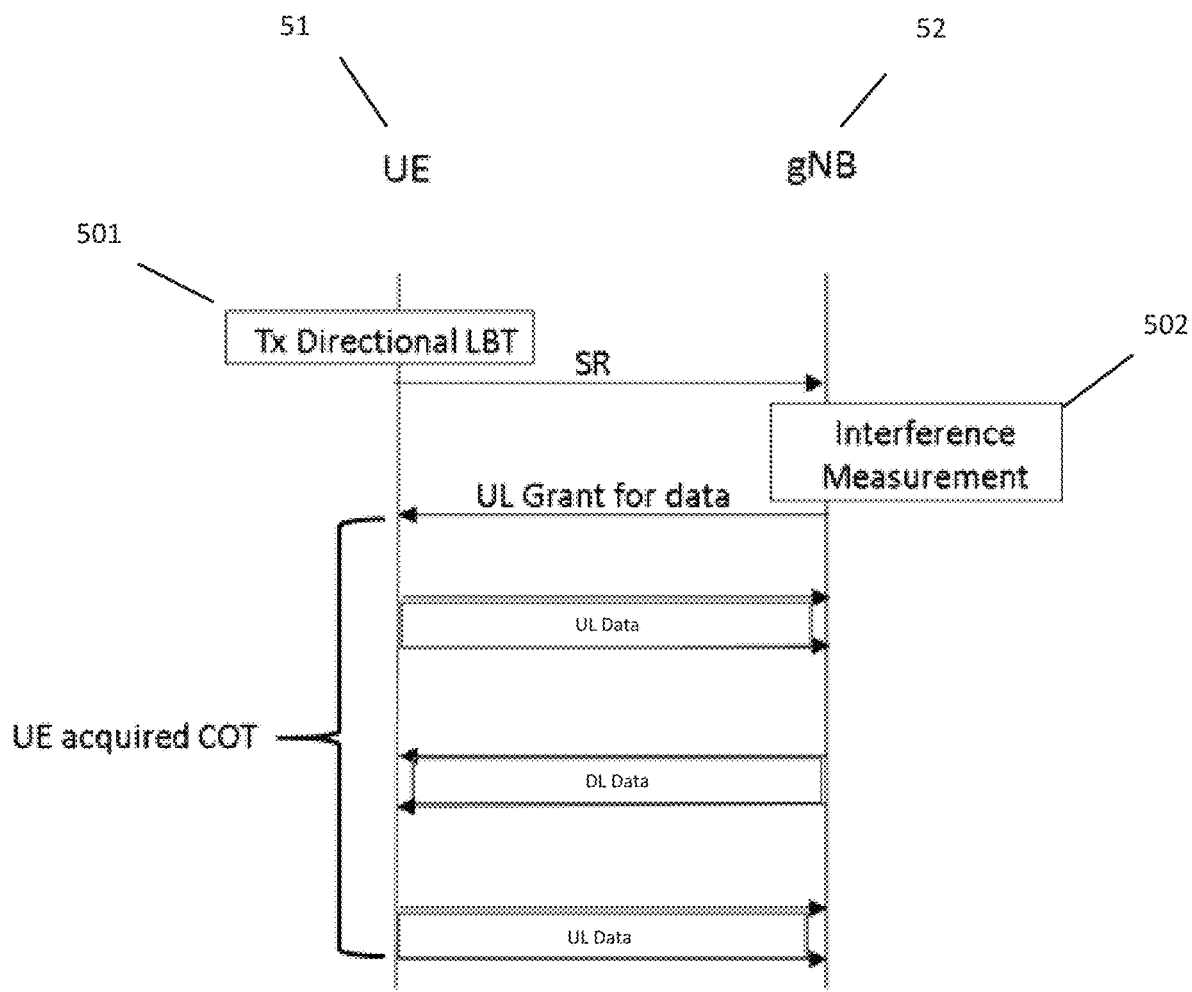
FIG. 5 illustrates a dynamic grant receiver-assisted LBT configuration in the uplink, according to an embodiment.

FIG. 5 illustrates a dynamic grant receiver-assisted LBT configuration in the uplink, according to an embodiment.

Referring to FIG. 5, gNB (e.g., a BS) 52 is acting as the receiver and UE 51 is acting as the transmitter.

FIG. 5 is substantially similar to FIG. 4, with the main difference being that uplink scheduling is performed without BSR. That is, the uplink grant for PUSCH data transmission in FIG. 5, replaces the uplink grant for BSR in FIG. 4. The DCI format for the uplink grant (e.g., DCI 0_1 as of Rel-16 NR unlicensed) may optionally need to be modified to add the COT information. Accordingly, step 501 in FIG. 5 is similar to step 401 in FIG. 4, and step 502 in FIG. 5 is similar to step 402 in FIG. 4.

Figure 6:
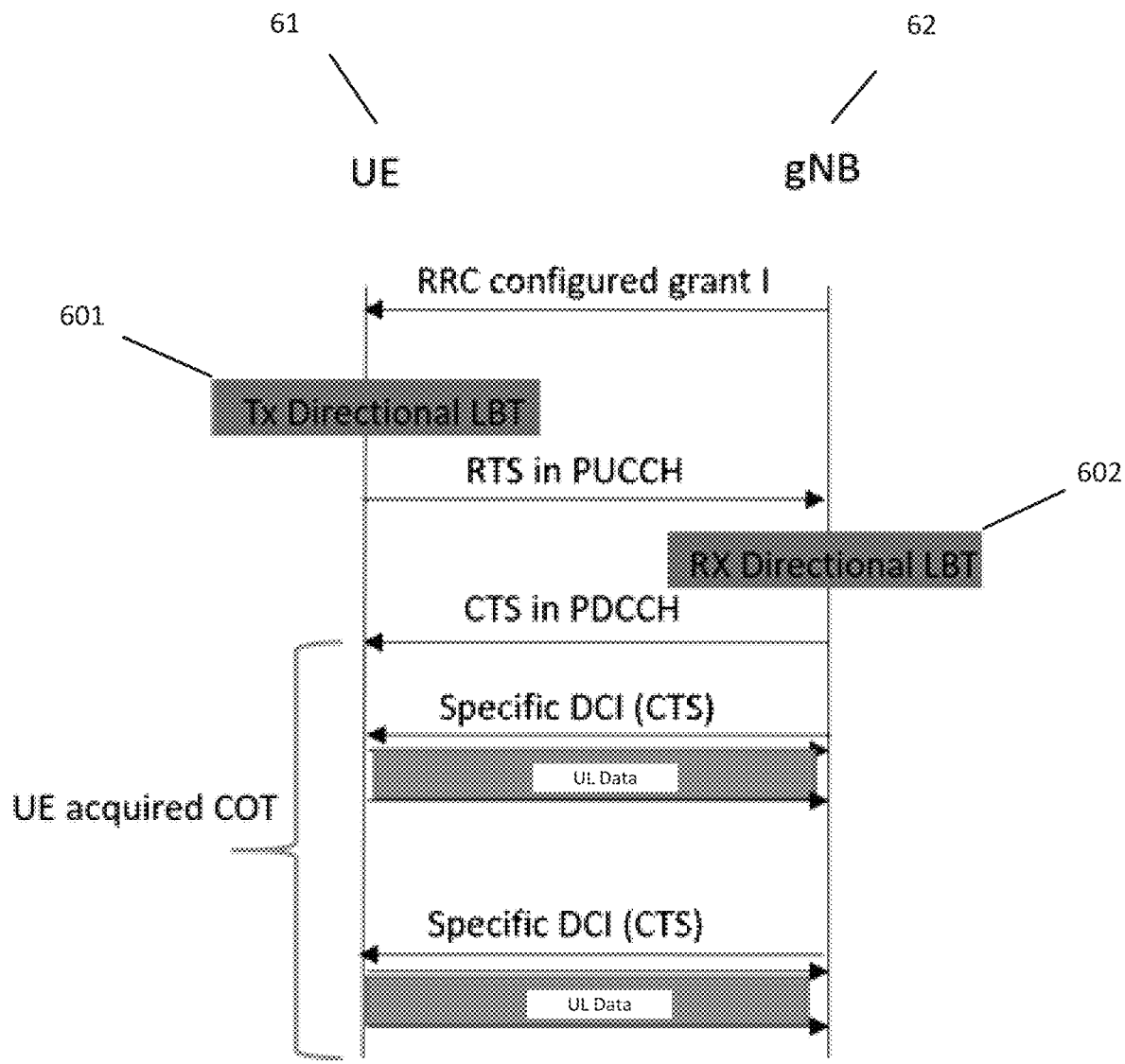
FIG. 6 illustrates a configured grant receiver-assisted LBT configuration in the uplink, according to an embodiment.

FIG. 6 illustrates a configured grant receiver-assisted LBT configuration in the uplink, according to an embodiment.

Referring to FIG. 6, gNB (e.g., a BS) 62 is acting as the receiver and UE 61 is acting as the transmitter.

Referring to FIG. 6, UE 61 receives an RRC configured grant type I from gNB 62. After receiving the configured grant, UE 601 performs transmission-side directional LBT in step 601 prior to transmission.

If directional LBT in step 601 is successful, UE 61 sends an RTS to gNB 62 to initiate an RTS/CTS handshake procedure. The RTS may be sent in a PUCCH.

After receiving the RTS, gNB 62 performs reception-side directional LBT in step 602.

If the directional LBT in step 602 is successful, gNB 62 sends a CTS in DCI for UE 61 to acquire a COT duration.

Within the COT, before each uplink transmission, UE 61 may receive specific DCI including a CTS. If this specific DCI is not received, the uplink transmission occasion may be skipped.

Accordingly, the present application may provide enhancements for receiver-assisted LBT channel access. For example, a novel contention window adjustment scheme for receiver-assisted LBT is proposed. In addition, new transmitter behaviors within the COT duration specifically for receiver-assisted LBT are proposed.

Figure 7:
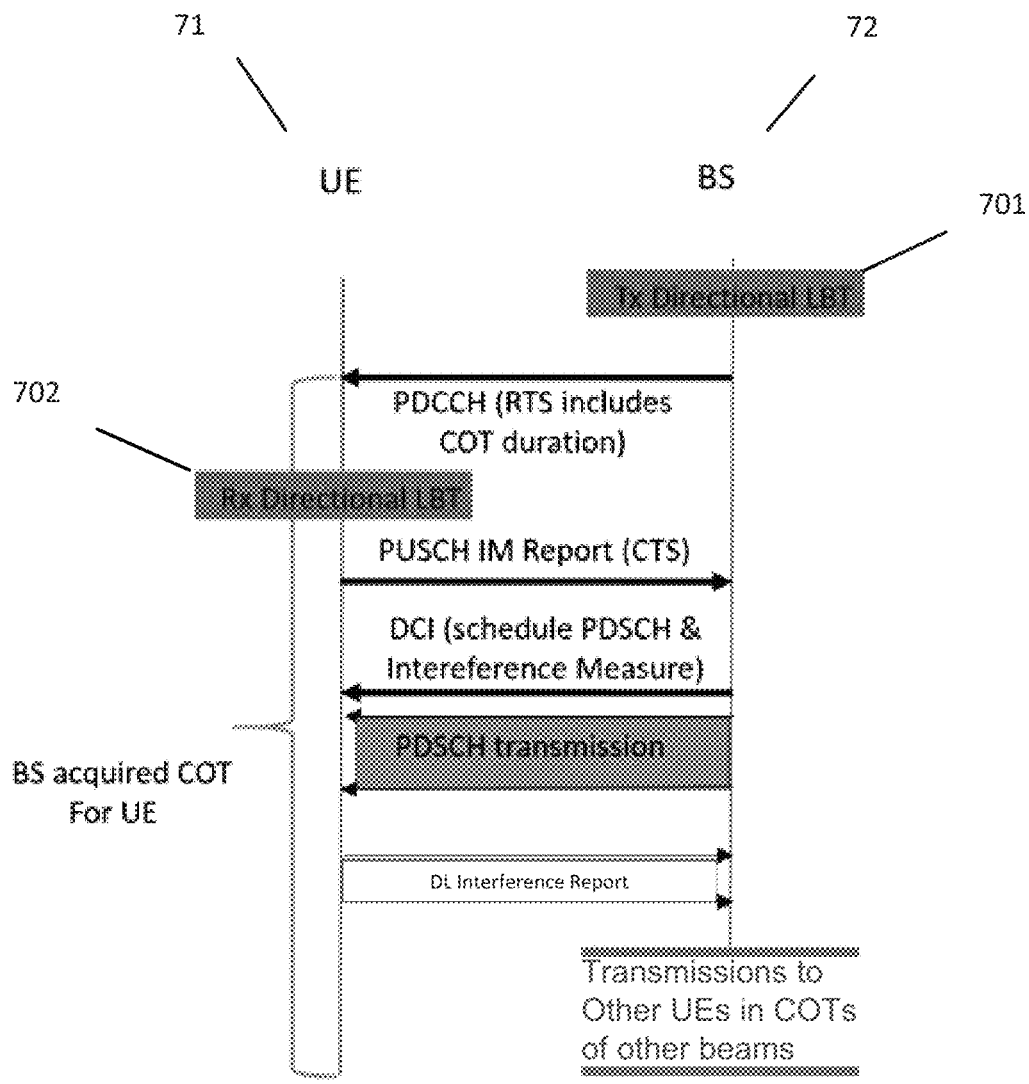
FIG. 7 illustrates a contention window adjustment for a specific TCI state in the downlink, according to an embodiment.

FIG. 7 illustrates a contention window adjustment for a specific TCI state in the downlink, according to an embodiment.

Referring to FIG. 7, UE 71 is acting as the receiver and BS 72 is acting as the transmitter.

The contention window adjustment for a specific TCI state may be based on a specific PDCCH DCI message (e.g., where an RTS includes a COT duration) and a specific PUSCH message (e.g., where an interference measurement report is transmitted with a CTS) that are exchanged between UE 71 and gNB 72. The specific DCI message may be similar to "DCI 2_0" in 3GPP Rel-16, which provides the remaining COT duration and other necessary information for the operation within the COT. The specific PUSCH message may carry the interference measurements at UE 71 for a given set of TCI states that may interfere a serving beam/TCI state.

Referring to FIG. 7, in step 701, BS 72 performs directional LBT. After performing directional LBT in step 701, BS 72 sends PDCCH information (e.g., an RTS including a COT duration as DCI information) to UE 71. Within the COT, before the downlink PDSCH transmission, UE 71 obtains an interference measurement and performs directional LBT in step 702. After performing the directional LBT in step 702, UE 71 sends an interference measurement report including a CTS via a PUSCH to BS 72 continuously or at pre-arranged intervals. After receiving the interference measurement report, BS 72 may decide whether or not to schedule the downlink transmission.

In this manner, BS 72 does not necessarily always transmit downlink data (e.g., via a PDSCH transmission), but rather, may decide whether or not to schedule the downlink transmission based on the uplink PUSCH interference measurement report from UE 71.

When BS 72 schedules a downlink transmission, BS 72 may transmit DCI to schedule PDSCH and an interference measurement to UE 71. Subsequently, BS 72 transmits a downlink PDSCH transmission to the UE 71 according to the DCI transmitted from BS 72. Additionally, UE 71 may transmit a downlink interference report to BS 72 according to the DCI transmitted from BS 72. The downlink interference report may be similar to the PUSCH interference measurement report, with the difference being that the downlink interference report may be scheduled according to the DCI transmitted from BS 72.

Accordingly, new transmitter behaviors within the COT duration, specifically for receiver-assisted LBT, may be realized.

In addition, as mentioned above, a novel contention window adjustment scheme for receiver-assisted LBT may be used.

For example, a contention window may be adjusted for a Rel-16 Type 1 channel access procedure performed by a transmitter. That is, a transmitter may sense a channel for a randomly selected duration within a window size. After a timer that is selected for the window size expires, the transmitter may access the channel. However, if the transmitter receives a NACK from the receiver, then a transmitted data packet may not have been received, and the window duration may need to be increased. Increasing the window duration may be referred to as a contention window adjustment.

A number of different contention window adjustment approaches may be used, and the contention window adjustment may not necessarily need to be based on the NACK from the receiver.

Referring to FIG. 6, for example, UE 61 is acting as the transmitter, and the contention window adjustment may be based on whether or not the CTS (e.g., UCI) is received from gNB 62. If UE 61 transmits an RTS to gNB 62 and does not receive a CTS, then UE 61 may not be able to start the COT for data transmission uploads. In this case, UE 61 may start a backoff timer up to a maximum time value defined as CWP, which may be doubled to increase the window duration. Therefore, UE 61 (i.e., the transmitter) may wait longer to access the channel. Accordingly, as described above, the contention window duration CWP may be increased (e.g., doubled) based on feedback information provided from the receiver (e.g., based on whether a specific CTS is received) instead of NACK information.

The contention window may be doubled up to a maximum size when not receiving specific PUSCH message within a pre-defined time window and may be reset to a pre-defined minimum size of the contention window when receiving the specific PUSCH message within a pre-defined time window. Thus, within the COT duration, HARQ feedback of data transmission (e.g., receiving a NACK) may not impact contention window adjustment.

Additionally, within the COT duration, a gNB may schedule further interference reports from a UE before its next downlink transmission within the COT, and if the next downlink transmission has a time gap larger than a time threshold from a previous downlink transmission, then the next downlink transmission may only be performed when both a gNB Cat 2 LBT (e.g., Cat 2 Type 2A or Type 2B LBT) is successful and the UE measured interference on the set of TCI states (e.g., in terms of measured RSSI) are each less than a pre-defined threshold.

In addition, the contention window within a COT may be doubled up to the maximum size if the received UE interference measurement at the gNB is larger than the pre-defined threshold.

For dynamic uplink scheduling for uplink transmission, the contention window adjustment for a specific TCI state may be based on the exchange of a specific PUCCH/PUSCH UCI message and a specific PDCCH message between the UE and gNB.

For example, as shown in FIG. 4, such a UCI message can be the SR message, whereas such a PDCCH message can be the downlink grant for the BSR report. Additionally, as shown in FIG. 5, the PDCCH message can also be a downlink grant message for uplink transmission if BSR is not needed.

In case the gNB measured receiver interference towards the UE is below a threshold, and if the gNB decides not to schedule the UE uplink transmission immediately according to a specific scheduling algorithm, then after the gNB successfully performs LBT, it may still need to immediately send a downlink grant message indicating no downlink grant to the UE for the confirmation of successful channel access (e.g., meaning that the interference at the gNB receiver is below the threshold). In this case, although the uplink transmission may not take place, the downlink transmission to that UE can occur by taking advantage of sharing the uplink COT.

For dynamic uplink scheduling for uplink transmission, the contention window at the UE may be doubled up to a maximum size when not receiving a specific PDCCH message within a pre-defined time window, after which the UE may re-send specific PUCCH or PUSCH message(s) to the gNB, and the contention window may be reset to a pre-defined minimum size.

Accordingly, within the COT duration, the (implicit) HARQ feedback of uplink data transmission (ACK/NACK) may have no impact on contention window adjustment.

Additionally, within the COT duration, a UE may request its next uplink transmission within the COT by sending an SR after a successful LBT to the gNB, if the SR transmission has a time gap larger than a time gap from a previous uplink transmission or a previous uplink grant. The next uplink transmission may only be performed after receiving the downlink grant from the gNB when the gNB's scheduling algorithm decides to schedule the UE uplink transmission; when the gNB Cat 2 LBT is successful; and when the gNB measured local interference on the set of TCI states towards that UE (e.g., a measured RSSI) are all less than a pre-defined threshold. If the gNB's scheduling algorithm decides not to schedule the UE uplink transmission but other conditions are met, the gNB may still need to send an uplink grant message with no grant to the UE to confirm the interference at the gNB is below the threshold.

Thus, within the COT, the contention window at the UE may be doubled up to the maximum size if the UE does not receive an uplink grant from the gNB within a pre-defined time window after the UE sends an SR to the gNB.

For uplink configured grant type I (e.g., as shown in FIG. 6), the UE may send a special PUCCH message (e.g., a special SR) to the gNB before starting the uplink transmission. The UE may only start the COT and uplink transmissions after receiving the specific DCI message from gNB. The specific DCI message may be a downlink feedback information (DFI) message to confirm the successful channel access in the uplink.

The specific DCI message from the gNB may only be sent if the gNB's directional LBT on a set of TCI states towards the UE are successful and its local interference measurement on a set of TCI states relevant to the UE are all below a pre-defined threshold.

Within the COT, if the gNB's directional LBT on a set of TCI states towards the UE are successful and its local interference measurement on a set of TCI states that can interfere the serving TCI state/beam of the UE are all below a pre-defined threshold, the gNB may send a specific DCI message (e.g., a DFI message) to the UE before every configured uplink transmission, such that the configured uplink transmission may only take place if the DCI message is received and the UE directional LBT is successful.

The contention window size may be doubled up to the pre-defined maximum size if the UE does not receive this specific DCI from the gNB within a pre-defined time window, and the contention window size may be reset to the minimum size if the UE does receive it before every configured uplink transmission occasion.

In the former case (if the UE does not receive the specific DCI), the UE may skip the current uplink transmission occasion and move to the next uplink occasion within the COT if the procedure can be repeated (e.g., if the COT duration allows). Otherwise, the UE may start channel access outside the COT.

Outside the COT, the next configured uplink transmission's starting time may depend on the successful reception of the gNB's specific DCI message, as described above. Thus, if the UE does not receive the specific DCI message from the gNB within a timer window, the random back-off timer may be started with the back-off counter being picked up from (0, CW). The UE may skip its next configured transmission occasion within this back-off counter time window, and re-try the same procedure in the next occasion when the back-off counter expires.

According to another embodiment, multiple beams may be used to configure and/or transmit data between the UE and the gNB (e.g., the BS). Accordingly, a receiver-assisted multi-beam LBT is introduced. It is noted that multi-beam LBT embodiments may include one or more of the configurations of the UE and gNB (e.g., BS) that were previously discussed.

Multi beam type I is defined as multiple layers/data streams between transmission and reception. Multi beam type II is defined as single layer transmission using multiple beams between transmission and reception.

Figure 8:
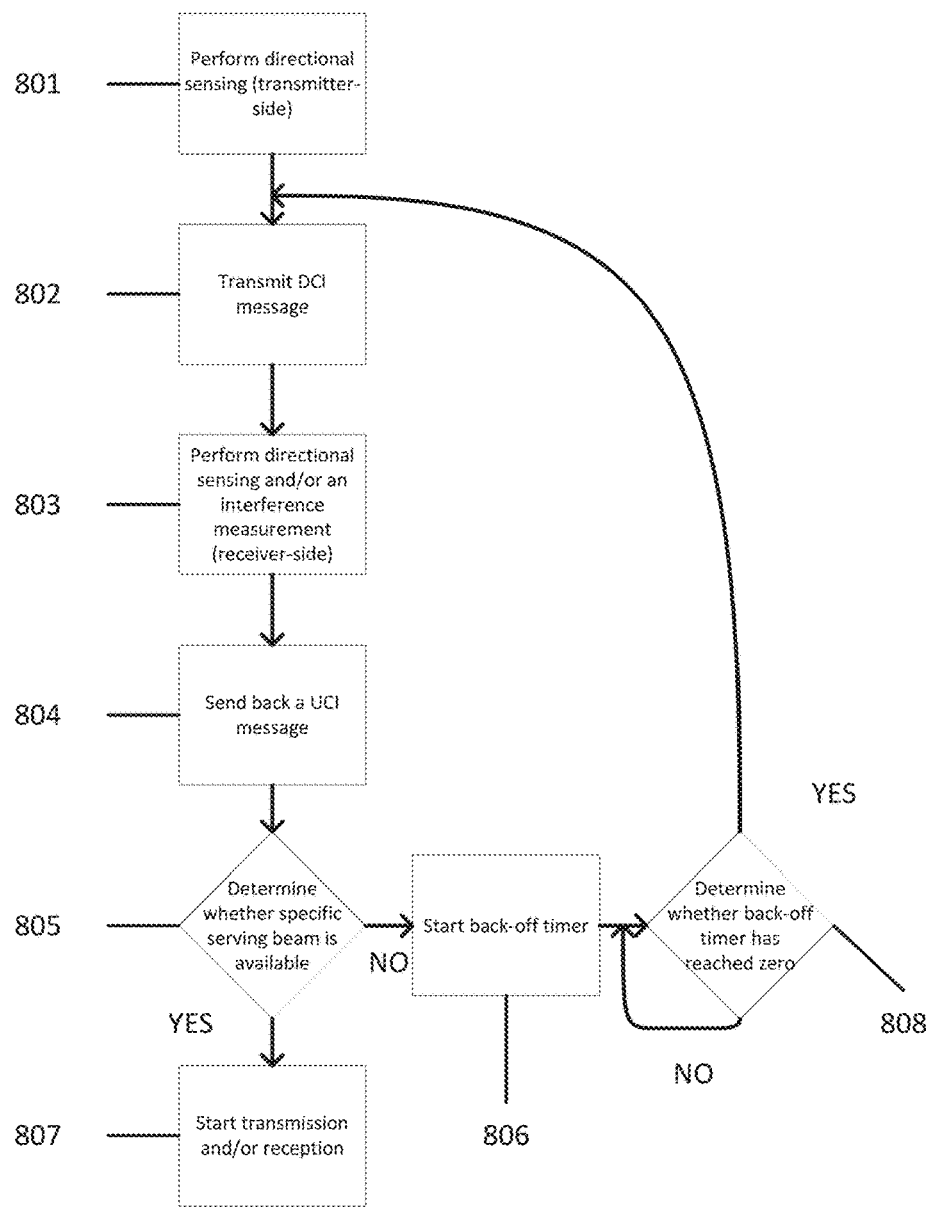
FIG. 8 is a flowchart illustrating a method of receiver-assisted multi-beam LBT in the downlink, according to an embodiment.

FIG. 8 is a flowchart illustrating a method of receiver-assisted multi-beam LBT in the downlink, according to an embodiment.

In step 801, a gNB performs directional sensing (e.g., CCA) on a set of pre-determined beams towards a UE, either sequentially in a set of time slots or simultaneously in one time slot, depending on the capability of the transmitter (e.g., the gNB). The medium in a specific beam (e.g., the status of a specific beam) is determined by comparing the detected energy in that specific beam to a specific threshold value in that specific beam (e.g., a medium is busy if the detected energy is larger than the threshold for a fixed time duration, otherwise the medium is idle).

In step 802, the gNB transmits a specific DCI message to the UE. If the beam sensed previously is idle, the gNB sends a specific DCI message to the UE via that specific beam. Alternatively, if multiple beams are sensed to be idle, the transmitter (e.g., the gNB) just sends one DCI message over one of the idle beams. In addition, if multiple beams are sensed to be idle, the transmitter can also send one DCI message over the set of idle beam using multi-beam type II transmissions. The specific DCI message may be similar to DCI 2_0 in Rel-16 which provides the remaining COT duration for each of the downlink serving beams and other information necessary to the operation within the COT.

In step 803, the UE performs directional sensing (e.g., CCA) and/or an interference measurement on a set of TCI states/beams that can cause interference with the set of serving beams from which the specific DCI is received.

In step 804, the UE sends back a specific UCI message to the gNB via one beam out of a subset of the serving beams, where each beam in the subset and its potential interfering beams at the UE are sensed to be idle. Alternatively, if multiple beams in the subset are sensed to be idle, the UE can send one specific UCI message over multiple idle beams using multi-beam type II transmissions. The UCI message may contain the interference measurement report at the UE which may include the measurement results for a set of TCI states measured at UE.

If a sensed serving beam or at least one potential interfering beam of this serving beam at the UE is sensed to be busy, the UE may not send any UCI back to the gNB on that serving beam. Or, if only one UCI is sent back to the gNB via one of the serving beams, this UCI may contain the information indicating the set of serving beams available for reception and the set of serving beams not available for reception due to the detected interference at UE being high.

In step 805, the gNB determines whether a specific serving beam is available. For example, the gNB may determine the specific serving beam not to be available if the gNB does not receive a specific UCI message on the specific serving beam or receives the specific UCI message indicating the specific serving beam is not available for reception due to interference.

If the specific serving beam is not available, then in step 806, the gNB starts a back-off timer. In addition, if the previously sensed beam is busy before sending a specific DCI, the gNB may start the back-off timer. The back-off timer duration may be randomly drawn from a window between (0, CW), where CW can be specific to each beam. The CW size for that specific serving beam can be doubled up to a maximum size. The CW size for that specific serving beam may also be reset to the minimum value if the gNB receives that specific UCI for that beam.

For the subset of beams sensed to be idle and for which the specific DCI and UCI message exchange with the UE has been completed, then the specific serving beam is determined to be available and, in step 807, the gNB starts transmission and/or reception of data over the multiple beams along the subset of sensed beams, for a COT duration. For a full duplexing transmitter, as in the case of the gNB, other beams sensed to be busy at the gNB are reduced whenever the medium is sensed to be idle in one time slot for that specific beam.

Within the COT duration, the gNB may schedule additional interference reports and/or specific UCIs for each of the serving beams over which previous specific DCI and/or UCI message exchanges are completed from the UE before its next downlink multi-beam transmission within the COT, if the next downlink transmission has a certain time gap larger than a predetermined value from the previous downlink transmission. Then, the next downlink transmission may only be allowed to be performed on the specific serving beam when both the gNB Cat 2 (e.g. Type 2B) LBT on that specific serving beam is successful, and the UE measured interference on the set of TCI states that can interfere with this specific serving beam (e.g., in terms of measured RSSI) are all less than a pre-defined threshold, or specific UCIs from the UE are received on the serving beams. The gNB can perform simultaneous downlink transmissions on the subset of serving beams so long as the downlink transmissions over the serving beams have an acceptable interference at the UE.

In addition, within the COT, the contention window for a specific serving beam may be doubled up to the maximum size if the received UE interference measurement on the set of TCI states that can interfere with that specific serving beam at the gNB are all larger than the predefined threshold or a first specific UCI from the UE is received. The contention window for a specific serving beam may be reset to the minimum size when those interference measurements are all less than the pre-defined threshold or a second specific UCI from the UE is received.

In step 808, the gNB determines whether the back-off timer has reached zero. When the back-off timer for a beam reaches zero and the beam has been sensed to be idle for a fixed duration, the gNB transmits the specific DCI message to the UE via that beam following the steps described above starting from step 802.

Figure 9:
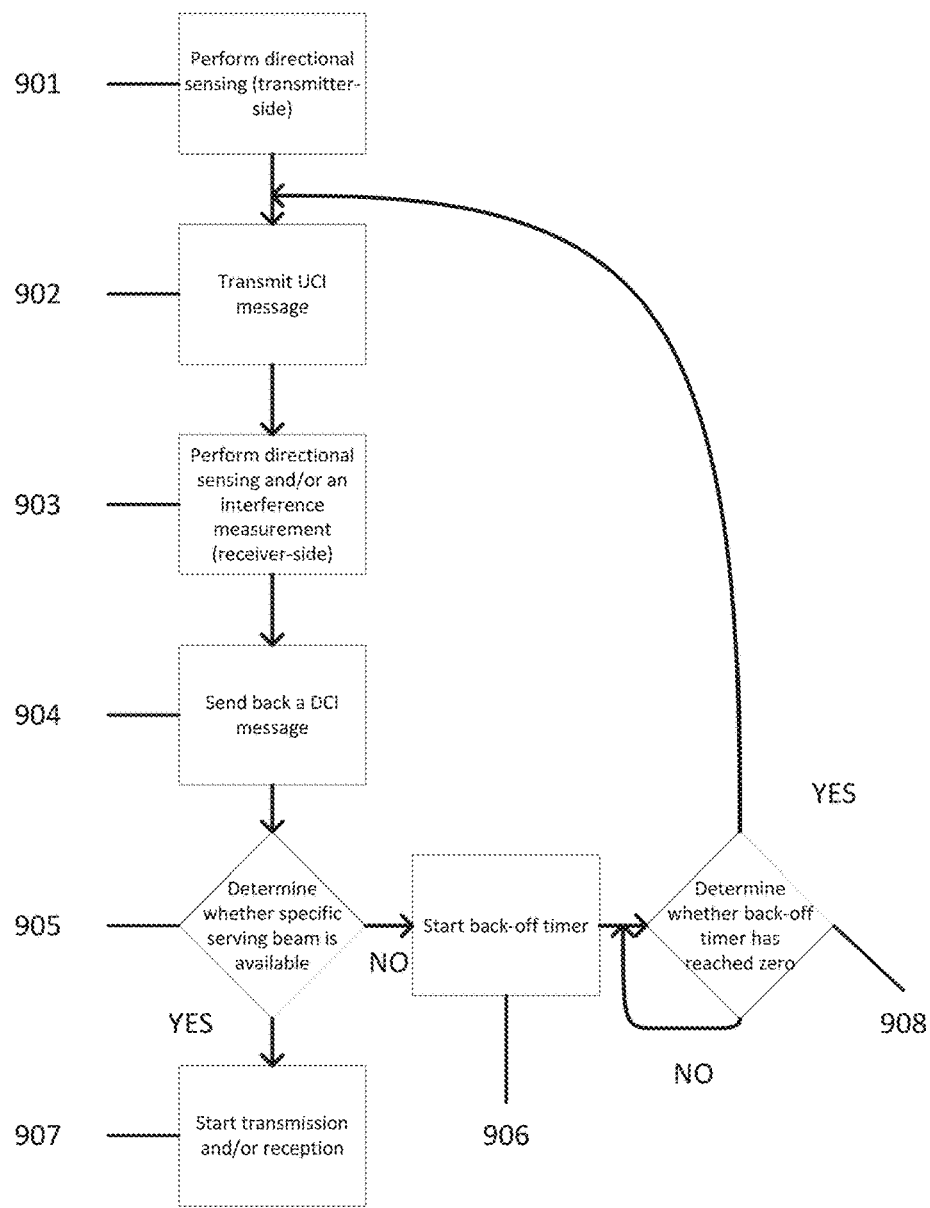
FIG. 9 is a flowchart illustrating a method of receiver-assisted multi-beam LBT for an uplink transmission, according to an embodiment.

FIG. 9 is a flowchart illustrating a method of receiver-assisted multi-beam LBT for an uplink transmission, according to an embodiment.

Although the steps shown in FIG. 9 may appear similar to their counterparts in FIG. 8, as explained below, details necessary to perform each of the steps of FIG. 9 may differ from that of FIG. 8. Particularly, some of the functions of a UE, described above with respect to FIG. 8, are assigned to a gNB, and vice versa. In addition, the manner in which the functions are executed may be changed as well.

Referring to FIG. 9, in step 901, a UE performs directional sensing (e.g., CCA) on a set of pre-determined beams towards a gNB, either sequentially in a set of time slots or simultaneously in one time slot, depending on the capability of the UE. The medium in a specific beam (e.g., a state of the specific beam) is determined by comparing the detected energy in that specific beam to a specific threshold value in that specific beam (e.g., a medium is busy if the detected energy is larger than the threshold for a fixed time duration, otherwise the medium is idle).

In step 902, the UE transmits a specific UCI message to the gNB. If the beam sensed previously is idle, the gNB sends a specific DCI message to the UE via that specific beam. Alternatively, if multiple beams are sensed to be idle, the UE just sends one UCI message over one of the idle beams. Alternatively, if multiple beams are sensed to be idle, the UE can also send one UCI message over the set of idle beams using multi-beam type II transmissions.

In step 903, the gNB performs directional sensing (e.g., CCA) and/or an interference measurement on a set of TCI states/beams that can interfere the set of serving beams.

In step 904, the gNB sends back a specific DCI message to the UE via one beam out of a subset of the serving beams, where each beam in the subset and its potential interfering beams at the UE are sensed to be idle. Alternatively, if multiple beams in the subset are sensed to be idle, the UE can send one specific DCI message over multiple idle beams using multi-beam type II transmissions. The DCI message may include a subset of TCI states or serving beams that the UE can simultaneously send uplink traffic on, as well as the COT duration and resource block (RB) allocations/uplink grant per serving beam for uplink transmissions.

If a sensed serving beam or at least one potential interfering beam of the serving beam at the gNB is sensed to be busy, the gNB may not send any DCI grant back to the UE on that serving beam. The gNB may not grant any uplink resources for some of the available/idle serving beams according to the specific scheduling algorithm at the gNB. In this case, the gNB may still send the UE the specific DCI without the uplink grant indicating the serving beam is sensed to be idle at the gNB, and the UE-initiated COT for this serving beam may be successful.

In step 905, the UE determines whether a specific serving beam is available. For example, the UE may determine the specific serving beam not to be available if the UE does not receive a specific DCI message on the specific serving beam or receives the specific DCI message indicating the specific serving beam is not available for reception due to interference.

If the specific serving beam is not available, then in step 906, the UE starts a back-off timer. In addition, if the previously sensed beam is busy before sending a specific UCI, the UE may start the back-off timer. The back-off timer duration may be randomly drawn from a window between (0, CW), where CW can be specific to each beam. The CW size for that specific serving beam can be doubled up to a maximum size. The CW size for that specific serving beam may also be reset to the minimum size.

For the subset of beams sensed to be idle and for which the specific DCI and UCI message exchange with the gNB has been completed, then in step 907, the UE starts transmission and/or reception of data using multibeam type I for a COT duration. For a half-duplex UE, the other beams sensed to be busy at the UE are frozen for the duration of their back-off timer until the transmissions from the beams sensed to be idle is complete. After that, each of the other beams sensed to be busy may be reduced when the medium is sensed to be idle at one time slot for that specific beam. For a full duplexing UE, each of the other beams sensed to be busy at the UE may be reduced whenever the medium is sensed to be idle in one time slot for that specific beam.

Within the COT duration, the UE may request its next uplink transmission within the COT by sending an SR via one or more multiple serving beams using multibeam type II if Cat 2 LBT used on these serving beams at the UE is successful, if the SR transmission has a certain time gap larger than a previous uplink transmission or a previous uplink grant. Then, the next uplink transmission may only be allowed to be performed on the specific serving beam when the UE receiving the uplink grant on that serving beam (e.g., gNB Cat 2 (type 2B) LBT on that serving beam) is successful and the gNB measured local interference on the set of TCI states that can interfere with the serving beam are all less than a pre-defined threshold. The gNB's scheduling algorithm may decide not to schedule the UE uplink transmission via that serving beam even if it is sensed to be idle. For example, the gNB may still send a DCI message with no grant to UE on that serving beam to confirm that serving beam at the gNB is idle. The uplink grant(s) of each idle serving beam can be sent via only one serving beam which contains all the uplink grants for each of the idle serving beams at gNB. The UE can perform uplink transmissions simultaneously using type I multibeam transmission on these available idle serving beams.

In addition, within the COT, the contention window for a specific serving beam may be doubled up to the maximum size if the UE does not receive the uplink grant for that serving beam within a pre-defined time window after the UE sent the SR via that specific beam. The contention window for a specific serving beam may be reset to the minimum size when the UE receives the uplink grant for that serving beam.

In step 908, the UE determines whether the back-off timer has reached zero. When the back-off timer for a beam reaches zero and the beam has been sensed to be idle for a fixed duration, the UE re-transmits the specific UCI message to the gNB via that beam following the steps described above starting from step 902.

In addition to the multibeam embodiments presented in FIGS. 8-9, which illustrate cases in which transmissions are dynamically scheduled, uplink transmissions may also be scheduled via a configured grant.

For instance, after directional sensing has been successfully performed on the transmission-side and the reception-side, and UCI and DCI information has been exchanged (e.g., similar to steps 901-904 in FIG. 9) to establish a COT, then within the COT, for each serving beam, when the gNB's directional LBT for the serving beam is successful and its local interference measurement on the set of TCI states/beams that can interfere with this serving beam are all below a pre-defined threshold, the gNB may send a specific DCI message via this serving beam (e.g., a special DFI message) to the UE for this serving beam before every configured uplink transmission, such that the configured uplink transmission on this serving beam only takes place if the DCI message is received via this serving beam and UE directional LBT on this serving beam is successful. The UE can perform simultaneous multi-beam uplink transmissions over the set of serving beams which are sensed to be idle both at the UE and the gNB using multi beam transmission type I.

The contention window size for a serving beam may be doubled up to the pre-defined maximum size if the UE does not receive the specific DCI via the serving beam from the gNB within a pre-defined time window, and the contention window size may be reset to the minimum size if the UE does receive the specific DCI via the serving beam for each configured uplink transmission.

Outside the COT, the next configured uplink transmission's starting time for a serving beam depends on the successful reception of the gNB's specific DCI message via that serving beam, as described above. If the UE does not receive the specific DCI message via the serving beam from the gNB within a time window, the UE may start the random back-off for that serving beam and skip its next configured uplink transmission within the backoff counter time window. The UE may re-try the same procedure for the next uplink transmission occasion for the serving beam once the back-off counter expires.

According to another embodiment, message-based receiver assisted LBT may be used to reduce interference.

As described above, for downlink transmissions, a BS may transmit DCI (e.g., including an RTS message) to trigger an interference measurement so the UE may report it to the BS as a CTS message. For uplink transmissions, the UE may send an SR to the BS as an RTS message, and receive a UL grant as the CTS message via a PDCCH However, in both instances, RTS and CTS messages may only be decoded between a serving UE and a serving BS. This may be considered to be a consequence of Class A Channel Access for Beyond 52 GHz, where a receiver provides assistance information (e.g., signaling) to the transmitter only. Accordingly a Class B Channel Access scheme for Beyond 52 GHz may be used for NR to have mechanisms to support Class B LBT, where a UE on one system can inform the second system of the interference conditions over the air. In a Class B Channel Access scheme, the receiver may provide assistance information (e.g., signaling) to other NR nodes, including non-serving nodes. In addition, in a Class C Channel Access Scheme, the receiver may provide assistance information (e.g., signaling) to other NR nodes and nodes from other radio access technology (RAT).

To adopt a Class B scheme, the interference report (e.g., CTS) that is transmitted from UE 21 in FIG. 2 can be decoded by other non-serving gNBs on the serving network and/or by other operator networks using the same RAT.

To adopt a Class B scheme, the uplink grant (e.g., CTS) that is transmitted from gNB 52 via PDCCH may be decoded by other non-serving UEs on the serving network and/or by other operator networks using the same RAT.

Figure 10:
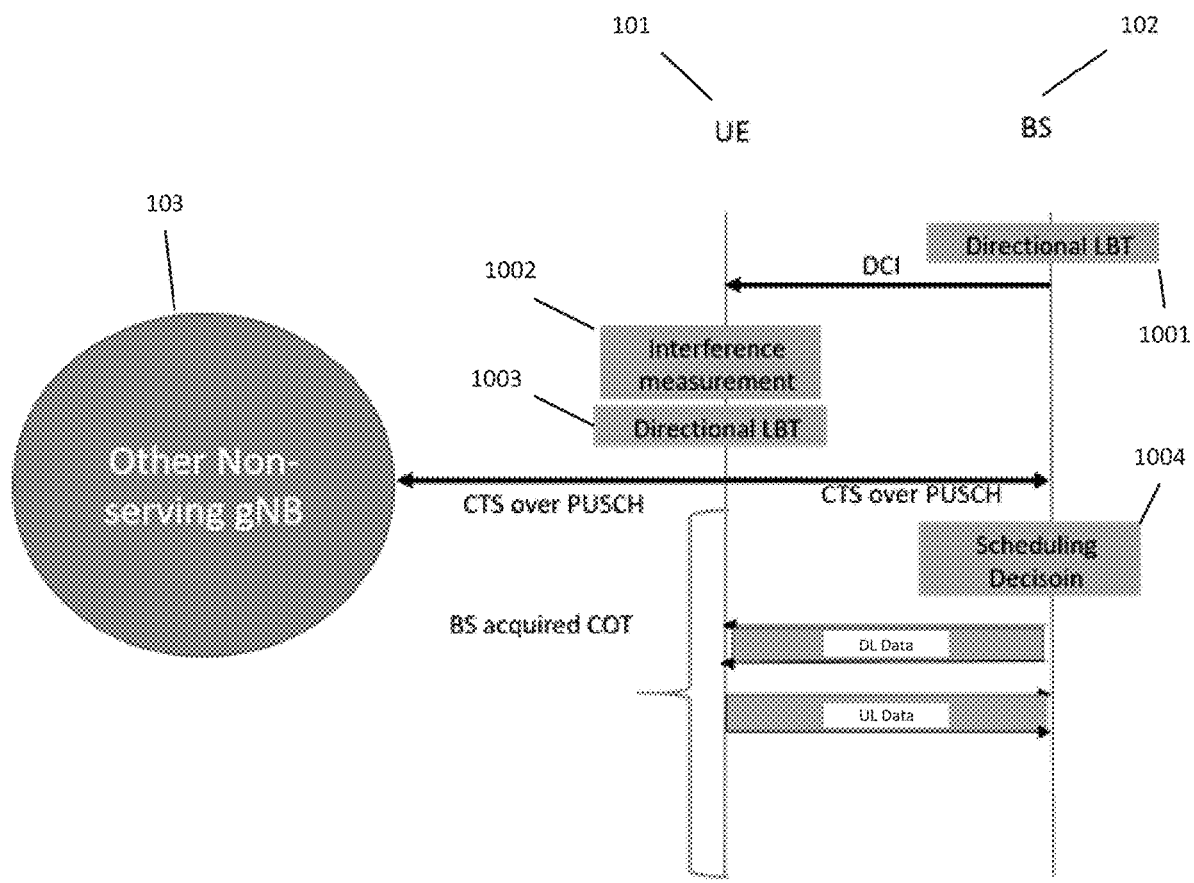
FIG. 10 illustrates a Class B receiver-assisted LBT configuration in the downlink, according to an embodiment.

FIG. 10 illustrates a Class B receiver-assisted LBT configuration in the downlink, according to an embodiment.

Referring to FIG. 10, UE 101 is acting as the receiver and BS 102 is acting as the transmitter.

The BS (e.g., gNB) 102 performs directional long LBT in step 1001. The directional LBT may be performed with a back-off timer with a sensing beam QCLed type D or E with the downlink transmission beam) towards the specific UE that the gNB intends to transmit downlink data. Depending on the system operating frequency, the desired system range, and other parameters, the gNB may perform omni-directional LBT instead of directional LBT. In addition, the UE could perform one shot directional LBT or no-LBT at all, if regulation allows. The LBT BW for the gNB to perform the directional LBT corresponds the downlink BW part (BWP) of the target UE, or a unit of LBT BW where the gNB performs directional LBT on a set of these units equal to the scheduled downlink frequency resources.

After LBT is successful, or without LBT if regulation allows, the BS 102 sends a message to the UE 101 to initiate the class B procedures. For example, the BS 101 may send DCI via a PDCCH to a specific UE 101 via a specific transmission beam to trigger the receiver-assisted LBT behaviors at the UE 101. This specific DCI may be scrambled by the cell radio network temporary identifier (C-RNTI) of the specific UE 101. This specific DCI implicitly or explicitly may indicate the UE 101 to perform class B receiver-assisted LBT behaviors (e.g., interference measurement via extended clear channel assessment (eCCA) or RSSI) and report it to the BS 102 after one or a set of successful directional LBTs. This DCI may also schedule the frequency and time resources for PDSCH transmissions after the successful receiver assisted LBT. For example, the DCI can be the legacy DCI format 1_0 or 1_1, where receiver assisted LBT behaviors at the intended UEs can be implicitly triggered (e.g., triggered once UE 101 receives the legacy DCI, the UE 101 starts the receiver-assisted LBT behaviors). Alternatively, the legacy DCI format 1_0 or 1_1 can be modified by using 1 or a few of its reserved bits to explicitly indicate the UE to perform receiver-assisted LBT behaviors. In addition, the DCI can be modified by using some of its reserved bits to indicate the measurement configuration including the frequency BW of interference measurements.

In addition, the UE 101 may send a group DCI to a set of intended UEs. This group DCI may explicitly indicate for the UEs to perform the required measurements for class B receiver-assisted LBT. Each of the UEs receiving this group DCI may perform these measurements. For example, the group DCI can be a modified DCI format 2_0 by using one or a set of the reserved bits to explicitly indicate for the UEs to perform the required measurements for class B receiver assisted LBT, as well as to indicate the measurement configuration at the UE including the frequency BW of interference measurements.

In step 1002, the UE 101 performs interference measurements. The UE 101 may perform interference measurements via eCCA or RSSI measurements on one or a set of specific downlink beams in directions which may interfere the downlink reception beam of PDCCH and PDSCH transmissions from the BS 102. In another case, UE 101 may perform interference measurements via eCCA or RSSI measurements on a quasi-omni-directional downlink beam, which covers the downlink reception beam of the PDCCH and PDSCH transmission from the BS 102. To determine the set of downlink interference measurement beams per UE, the BS 102 can explicitly configure these to the specific UE 101 by the previous DCI message (e.g., modifying the DCI 1_0 or DCI 1_1 format by using a few of its reserved bits to indicate the set of downlink interference measurement beams). Alternatively, the BS 102 can also explicitly configure these downlink interference measurement beams to the specific UE by UE-specific RRC signaling. Further, UE 101 can determine the set of downlink interference measurement beams autonomously based on its existing downlink reception beam from BS 102 (e.g., if there is a pre-mapping between a given downlink reception beam and a set of downlink interference measurement beams at a specific UE). The measurements per downlink beam can be performed in a similar way as the class A LBT procedures, described above. In another case, the UE 101 may also determine the interference measurement configuration including the frequency domain resources by the scheduled frequency and time PDSCH resources indicated in the previously received DCI.

In step 1003, the UE 101 performs LBT procedures. The UE 101 may perform directional LBT with the sensing beam (e.g., QCLed type D or E with uplink transmission beam). This LBT procedure can be a one-shot LBT (e.g., a Cat 2 LBT) or a long LBT with back-off timer (e.g., a Cat 3 or Cat 4 LBT). If the directional LBT is successful, the UE may send a CTS via the uplink transmission beam for its serving BS 102. This directional LBT can be a one-shot LBT (e.g., Cat 2 LBT) or a long LBT with back-off timer (e.g., a Cat 3 or Cat 4 LBT). If a directional LBT is successful, the UE 101 may send a CTS via the uplink transmission beam to its serving BS 102. In addition, the UE 101 may perform another set of directional LBT with the set of sensing beams that may interfere with the downlink PDCCH and PDSCH reception beam. These directional LBTs can be a one-shot LBT (e.g., a Cat 2 LBT) or a long LBT with a back-off timer (e.g., a Cat 3 or Cat 4 LBT). If a directional LBT over one of the beams in the set of sensing beams is successful, the UE 101 may send a CTS via an uplink transmission beam to other non-serving gNBs 103 (e.g., or other non-serving BSs) which is QCLed type D or E with this sensing beam. Alternatively, the UE 101 may perform one quasi-omni-directional LBT with the sensing beam that covers the downlink PDCCH and PDSCH reception beam. This quasi-omni-directional LBT can be a one-shot LBT (e.g., a Cat 2 LBT) or a long LBT with a back-off timer (e.g., a Cat 3 or Cat 4 LBT). If quasi-omni-directional LBT is successful, the UE may send a CTS via an uplink quasi-omni-directional transmission beam to other non-serving gNBs 103.

In some cases, the UE 101 may not perform LBT at all before sending the CTS. For instance, the UE 101 may send a CTS via the uplink transmission beam for its serving gNB (e.g., BS 102) without LBT. In addition, the UE 101 may send a set of CTSs via a set of uplink transmission beams to other non-serving gNBs 103, each of which is QCLed type D with a downlink beam which can interfere with the downlink reception beam of PDCCH and PDSCH transmissions. Alternatively, the UE may send a CTS via an uplink quasi-omni-directional transmission beam to other non-serving gNBs.

It may be necessary for the CTS to be decodable by all gNBs, which puts constraints on the system design. For example, the CTS must be sent on a resource that all gNBs know to monitor to find the CTS, and a CTS from the serving UE can be transmitted on a PUSCH via one resource unit selected from a pre-configured PUSCH resource pool (and a gNB may blind decode the whole pool), similar to message A transmission in 2 step RACH. The PUSCH resource pool can be signaled to the UE via RRC signaling (e.g., via a system information block (SIB)). When the UE selects a PUSCH resource, it could be indicated in the DCI (indexed on the resource pool or the BWP) which may trigger the UE receiver assisted LBT type B behavior, the UE may randomly select one resource in the pool, or there might be a pre-determined order where the UE may have a pre-defined UE-specific resource.

In addition, to send the CTS on a resource that all gNBs know to monitor, the CTS can be transmitted on a legacy PUCCH resource unit selected from a pre-configured PUCCH resource pool consisting of a reserved set of legacy PUCCH resource sets which are shared with legacy uplink PUCCH transmissions or dedicated for CTS transmissions. The PUCCH resource pool can be signaled to the UE via RRC signaling (e.g., via an SIB). When the UE selects a PUCCH resource, it could be indicated in the DCI (indexed on the resource pool or the BWP), which may trigger the UE receiver-assisted LBT type B behavior, or the UE may randomly select one resource in the pool. In addition, there might be a pre-determined order where the UE may have a pre-defined UE-specific resource upon triggering UE receiver-assisted LBT type B behavior.

Additionally, to send the CTS on a resource that all gNBs know to monitor, a new channel, common for all gNBs, can be defined, and specifically devoted to sending CTSs. An advantage of this solution is that the gNBs do not need to be synchronized.

In addition, when sending the CTS, the UE may use beamforming. However, the CTS may need to be sent in all directions, which may be taxing on system resources. Several solutions are possible. For example, the CTS could be sent in the beam direction of the serving gNB only. In addition, the UE can send multiple CTSs in multiple beam directions, as shown in FIG. 10. Alternatively, the CTS could be sent without beamforming so that the signal is sent in all directions. The CTS content may comprise a low number of bits, therefore by using a low coding rate, a high transmission power, or a small BW, the CTS range could be large enough for transmission even without beamforming.

In order to be decodable by all UEs, the CTS scrambling sequence must be known by all gNBs. Thus, the scrambling sequence should be based on a global RNTI (or equivalently, on a known hardcoded seed). The scrambling sequence may be dependent on the frame timing. Alternatively, the CTS may not be scrambled.

The CTS message may include a UE ID (such as a layer 2 (L2) ID). Within a cell, a serving gNB can receive multiple CTS messages from different serving UEs and non-serving UEs, including the L2 ID of each serving UE in each CTS to differentiate different serving and non-serving UEs at the serving gNB. L1 C-RNTI, while a possibility, cannot be used to differentiate different serving UEs' CTS messages for inter-operator signaling. Alternatively, the ID could be a pseudo-random number included in the initial DCI. L2 ID for each serving UE may be assigned by the network and only exist to be unique locally (e.g., a set of unique L2 IDs are pre-configured for a set of neighboring cells (e.g., belonging to intra- and inter-operator networks), where each cell is pre-configured with a subset list of L2 IDs for its serving UEs' CTS signaling). The CTS message may also include the interference measurement report (e.g., an RSSI measurement or eCCA measurement) and/or the COT duration for the downlink reception.

The PUSCH resource pool can be configured to the UE via SIB or RRC signaling. The PUSCH resource pool can be cell-specific or commonly shared between several neighboring cells. The CTS over PUSCH resource may be scrambled by a global common RNTI and include the L2 ID of the UE.

From L2 IDs, the serving gNB can differentiate CTS messages from different UEs, and CTS messages from non-serving UEs in intra-operator or inter-operator networks. Once a gNB receives one or several CTS messages from UEs from other networks on one of its receiving beams within a pre-defined time window, if the gNB is in a non-LBT mode on that receiving beam, it can be switched to an LBT mode or receiver-assisted LBT mode for its downlink transmissions either for that beam only, or for its overall operation.

If the LBT is not successful in step 1003, then the UE 101 may not do anything and skip future scheduled PDSCH receptions by previous DCI if the LBT is a one-shot LBT. Alternatively, the UE 101 may back-off and re-try LBT after the back-off timer expires if the LBT is a long LBT with a back-off timer.

Once the BS 102 receives CTS from the UE 101 and/or another non-serving gNB 103, the BS 102 performs a scheduling decision in step 1004. This may include acquiring the COT for UE 101 on this beam and starting the subsequent downlink PDSCH transmissions and uplink transmissions. Otherwise, if CTS is not received by the BS 102, the BS 102 does not transmit downlink data and may set itself to a back-off state before the next attempt.

Within the COT on this specific beam, if the time gap between the start of the next transmission (either from the UE 101 or the BS 102) and the end of current transmission is less than a threshold, the next transmission can be initiated without LBT and without interference measurements at both the transmitter and receiver. If the time gap is greater than or equal to the threshold, if the transmitter is the BS 102 (e.g., the gNB), after the successful directional LBT (either a one-shot LBT or a long LBT with a back-off timer) on the specific beam, the BS 102 may send DCI to the UE 101 to trigger the UE 101 to perform receiver-assisted LBT behaviors where the UE 101 performs directional LBT (either the one-shot LBT or long. LBT with a back-off timer) on the specific beam and sends the CTS to the BS 102 if LBT is successful. Once the BS 102 receives the CTS from the UE 101, the BS 102 may transmit downlink traffic over PDSCH to the UE 101.

Alternatively, if the UE is the transmitter, the procedure may be modified to perform uplink transmission.

Figure 11:
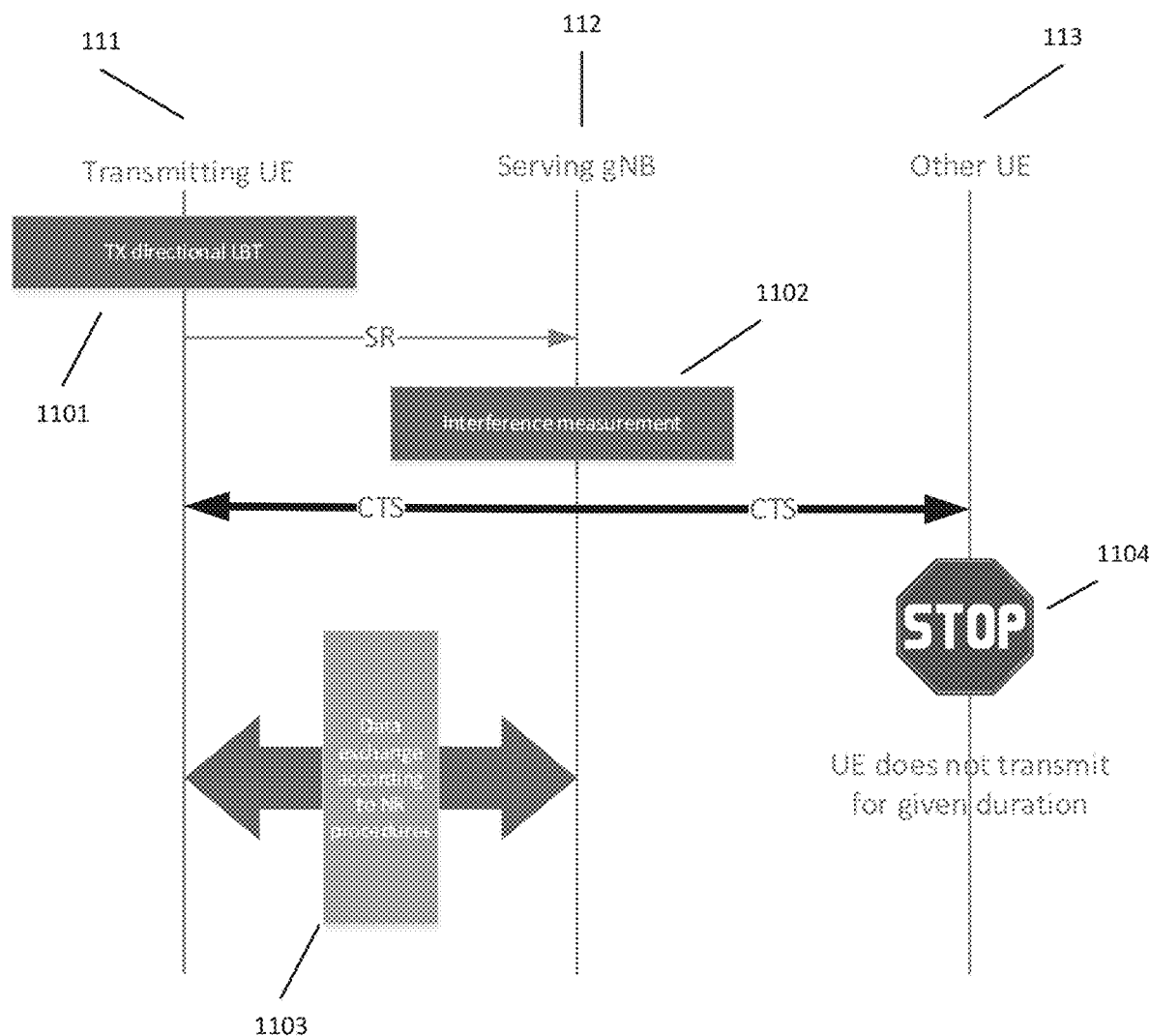
FIG. 11 illustrates a Class B receiver-assisted LBT configuration in the uplink, according to an embodiment.

FIG. 11 illustrates a Class B receiver-assisted LBT configuration in the uplink, according to an embodiment.

Referring to FIG. 11, gNB 112 is acting as the receiver and UE 111 is acting as the transmitter.

In step 1101, the UE 111 performs directional LBT. The directional LBT may be performed with a back-off timer with the sensing beam that is the same as the uplink transmission beam towards the gNB 112. Alternatively, if regulation does not mandate LBT, the UE 111 can also not perform LBT at all.

If LBT is successful (if applicable), then the UE 111 sends an SR via a PUCCH to the gNB 112 via a specific transmission beam to trigger the receiver assisted LBT at the gNB 112. Existing NR procedures to transmit the SR may be used. The SR may trigger the gNB 112 to perform Class B receiver-assisted LBT behaviors. If the regulation does not mandate LBT, the UE can also send the SR without LBT at all.

In step 1102, the gNB 112 performs interference measurements via eCCA or RSSI measurements on a specific beam over which the SR from the UE 111 is received. The gNB 112 may also perform interference measurements via eCCA or RSSI measurements on a set of uplink beam directions that may interfere with the uplink reception beam from that UE 111. The gNB 112 may determine the set of interfering uplink beam directions for a given uplink transmission beam from the UE 111 by implementation or pre-determined mapping. That is, for this step, the UE 111 may not be expected to do anything. In addition, if the gNB 112 does not perform LBT, then the gNB 112 may not perform interference measurements.

The gNB 112 may perform directional LBT with the sensing beam QCLed type D or E with the downlink transmission beam to the target UE 111. This LBT can be a one-shot LBT (e.g., a Cat 2 LBT) or a long LBT with a back-off timer (e.g., a Cat 3 or Cat 4 LBT). If the directional LBT is successful, based on specific scheduling algorithm, the gNB 112 may select a PDSCH resource to transmit the CTS to the UE, which is scheduled by DCI. The DCI may be scrambled by a global common RNTI and the CTS over PDSCH resource may include the L2 ID of the UE and uplink grant for the UE. Alternatively, the gNB 112 may transmit the CTS via PDCCH, which is scrambled by a global common RNTI which includes the L2 ID of the UE and uplink grant for the UE.

In addition, the gNB 112 may perform another set of directional LBTs, each of which has the same sensing beam as the uplink interference measurement beam in step 1102. Alternatively, if regulation allows, the gNB 112 may not perform any LBT at this step before sending out downlink traffic. Thus, for this step, the UE 111 may not be required to do anything.

If directional LBT on a specific beam is not successful, the gNB 112 may not do anything if the LBT is a one-shot LBT, or perform back-off and re-try directional LBT after the back-off timer expires if the LBT is a long LBT with a back-off timer. Otherwise, the gNB 112 may send a CTS over this specific downlink beam which is QCLed type D or E with the sensing beam. The gNB 112 may send multiple CTSs over a set of downlink beams, each of which is QCLed type D or E with the corresponding sensing beam that is the same as the uplink interfering beam identified in step 1102 or the uplink transmission beam from the intended UE. Alternatively, if regulation allows, the gNB 112 may not perform any directional LBT before sending out the CTS over one or a set of the aforementioned downlink beams, which are either QCLed type D with the uplink transmission beam or interfering beams.

Once the UE 111 receives the CTS from the gNB 112, the UE 111 acquires the COT on this beam and starts the subsequent uplink PUSCH transmissions in step 1103. In some conditions, the UE 111 may send a BSR to the gNB 112 and the gNB 112 may transmit an uplink grant for PUSCH transmission in DCI to the UE 111. Otherwise, the UE 111 may not transmit downlink data and sets itself to a back-off state before its next transmission attempt.

In addition, if another UE 113, which is not the transmitting UE 111, receives the CTS, this triggers this other UE 113 to not transmit for a given duration in step 1104. The duration that the UE 113 may not transmit may be exactly the COT duration indicated in the received CTS message from an on-going active uplink transmission of another UE (e.g., UE 111). For example, the duration for preventing UE 113 from transmitting can be the max COT value or any other COT value.

Within the COT on this specific beam, if the time gap between the start of the next transmission (either from the UE 111 or the gNB 112) and the end of a current transmission is less than a threshold, the next transmission can be initiated without LBT and without interference measurements at both the transmitter and receiver. If the time gap is greater than or equal to the threshold, if the transmitter is the UE 111, after the successful directional LBT (e.g., either the one-shot LBT or the long LBT with a back-off timer) on this specific beam, the UE 111 may send an SR to the gNB 112 as described above with reference to FIG. 11, to trigger the gNB 112 receiver-assisted LBT behaviors, where the gNB 112 performs directional LBT (e.g., either the one-shot LBT or long LBT with back-off timer) on this specific beam and sends the CTS to the UE 111 if LBT is successful. Once the UE 111 receives the CTS from the gNB 112, the UE 111 transmits uplink traffic over PUSCH to the gNB 112.

Figure 12:
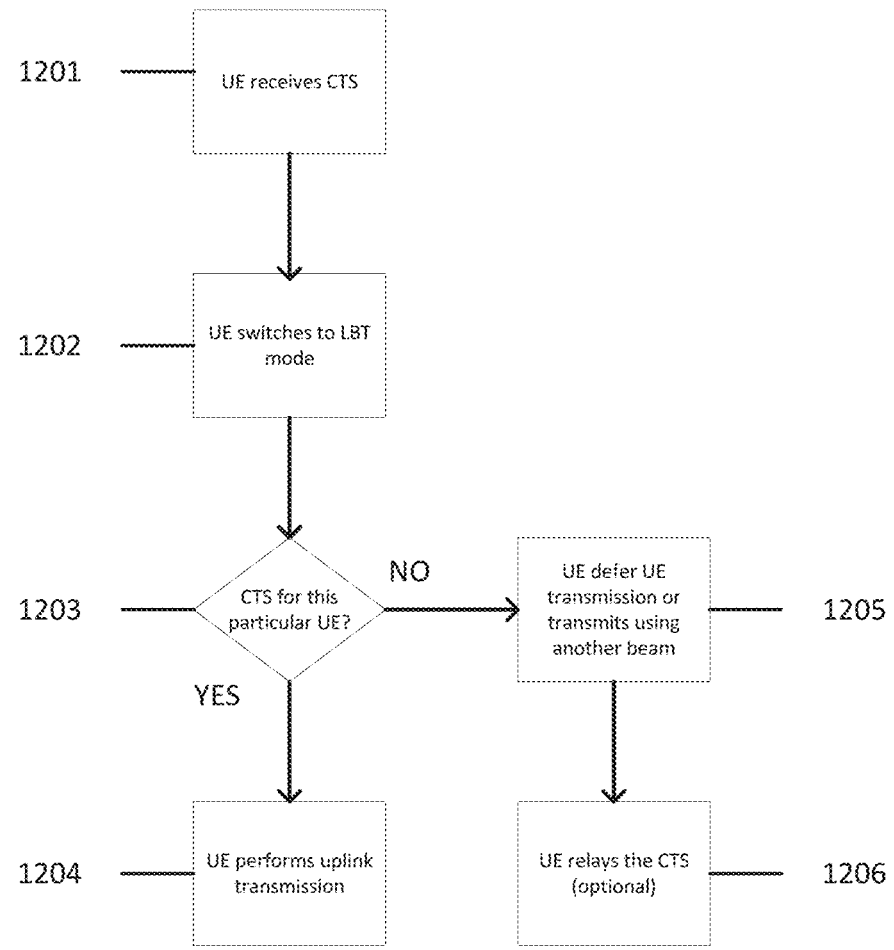
FIG. 12 is a flowchart illustrating a UE operation for uplink data transmission, according to an embodiment.

FIG. 12 is a flowchart illustrating a UE operation for uplink data transmission, according to an embodiment.

Referring to FIG. 12, in step 1201, the UE receives CTS. The CTS may be sent on resources that all UEs monitor. For example, the CTS may be sent on the PDCCH in a common search space. A novel DCI format may convey the CTS, and include a UE ID of the UE that is cleared to send. The UE ID can be, for example, the L2 UE ID.

Since a UE can receive multiple CTS messages from the serving gNB and non-serving gNBs, including the L2 ID of an active uplink transmission UE in each CTS, this can help differentiate between serving and non-serving gNBs. Ideally, the CTS should include the gNB IDs.

According to an embodiment, the L2 ID of the uplink UE may be used to represent the neighboring gNB IDs. The L1 C-RNTI, while a possibility, cannot be used to differentiate different non-serving gNBs' CTS messages for inter-operator signaling.

According to an embodiment, the ID could be a pseudo-random number included in the initial DCI. As in the uplink case, an L2 ID for each serving UE may be assigned by the network and may only be unique locally (e.g., a set of unique L2 IDs are pre-configured for a set of neighboring cells (e.g., cell that belong to intra- and inter-operator networks), where each cell is pre-configured with a subset list of L2 IDs for its serving UEs' CTS signaling. In addition, the DCI format that conveys the CTS may include a COT duration on the uplink beam for the uplink transmission.

It may be necessary to send the PDCCH message in a search space that is common to all gNBs. This search space configuration can be provided by RRC signaling or can be pre-configured. For this solution to work, all the networks may need to be synchronized. This can be achieved by, for example, having all gNBs use coordinated universal time (UTC) timing for synchronization, the UTC timing being obtained from a global positioning system (GPS) or another global navigation satellite system (GNSS). Then, if a UE synchronized to a first gNB receives a message from a second gNB, it will be able to receive it as long as the time difference is not substantially too large (e.g., in the order of a cyclic prefix length). For accommodating longer time differences, the CTS may also contain a short synchronization sequence so that the CTS may be self-decodable (however, this may still not mean that the network is synchronized, but this would allow the UE to accommodate larger time differences.).

The DCI including the uplink grant (e.g., the CTS) from the serving gNB can be scrambled in a common RNTI which is also known at other operator networks and includes an L2 ID (instead of a C-RNTI) to differentiate CTS messages to different serving UEs within the serving cell and non-serving UEs. Alternatively, if the DCI size is too small to carry the L2 ID, the CTS including the L2 ID can be carried in a PDSCH resource specifically scheduled by the gNB.

According to an embodiment, the CTS could be sent on a global control channel where all gNBs can transmit CTSs. The configuration of the resources for this global control channel should be known by the gNB (e.g., either by pre-configuration or by RRC signaling).

In step 1202, the UE switches to an LBT mode. If the UE already was in the LBT mode, no action is needed. Otherwise, if the UE is in a non-LBT mode for this receiving beam, once a UE receives one or several CTS messages from its non-serving gNBs on a downlink reception beam which is QCLed type D with its uplink transmission beam within a pre-defined time window (e.g., if the UE uses beams for transmission), the UE may switch to the LBT mode or a receiver-assisted LBT mode for its uplink transmissions.

In step 1203, the UE determines whether one or more of the CTS messages are for this particular UE. For example, after decoding the CTS, the UE may obtain the UE ID and can determine if this CTS is for its own transmission or not.

If the CTS is for this UE's own transmission, then in step 1204, the UE performs uplink transmission and can send data. The UE may then continue to proceed with a predetermined data procedure (e.g., sending BSR or performing the required LBT procedures).

If the CTS is not for this UE's own transmission, the UE cannot transmit data in this particular beam, and the UE defers UE transmission or transmits using another beam in step 1205. For example, if a previous transmission was ongoing, this transmission may be stopped. The decision to stop or not could be based on, for example, the priority of the ongoing transmission. In this case, the CTS message needs to have a priority field. "No transmission" may be valid for a duration that is either pre-configured or indicated in the CTS.

Depending on how the system operates, receiving a CTS intended for another UE could affect the UE behavior because the transmission could be stopped/prohibited on all beams and/or the transmission could be stopped for that beam only. In the latter case, the UE could then attempt a transmission on another beam.

In step 1206, the UE may optionally relay the CTS. The UE may also relay the received CTS information indicating a given beam/TCI state for the acquired COT duration to its serving gNB via a PUCCH or PUSCH after a successful LBT for an uplink transmission. Alternatively, the UE can defer sending an ACK/CTS to the serving gNB for the upcoming downlink transmission via the same beam indicated in the CTS received from the non-serving gNB.

According to an embodiment, the decision to relay the CTS to the serving gNB can be based on existing configurations obtained from, for example, RRC signaling.

Figure 13:
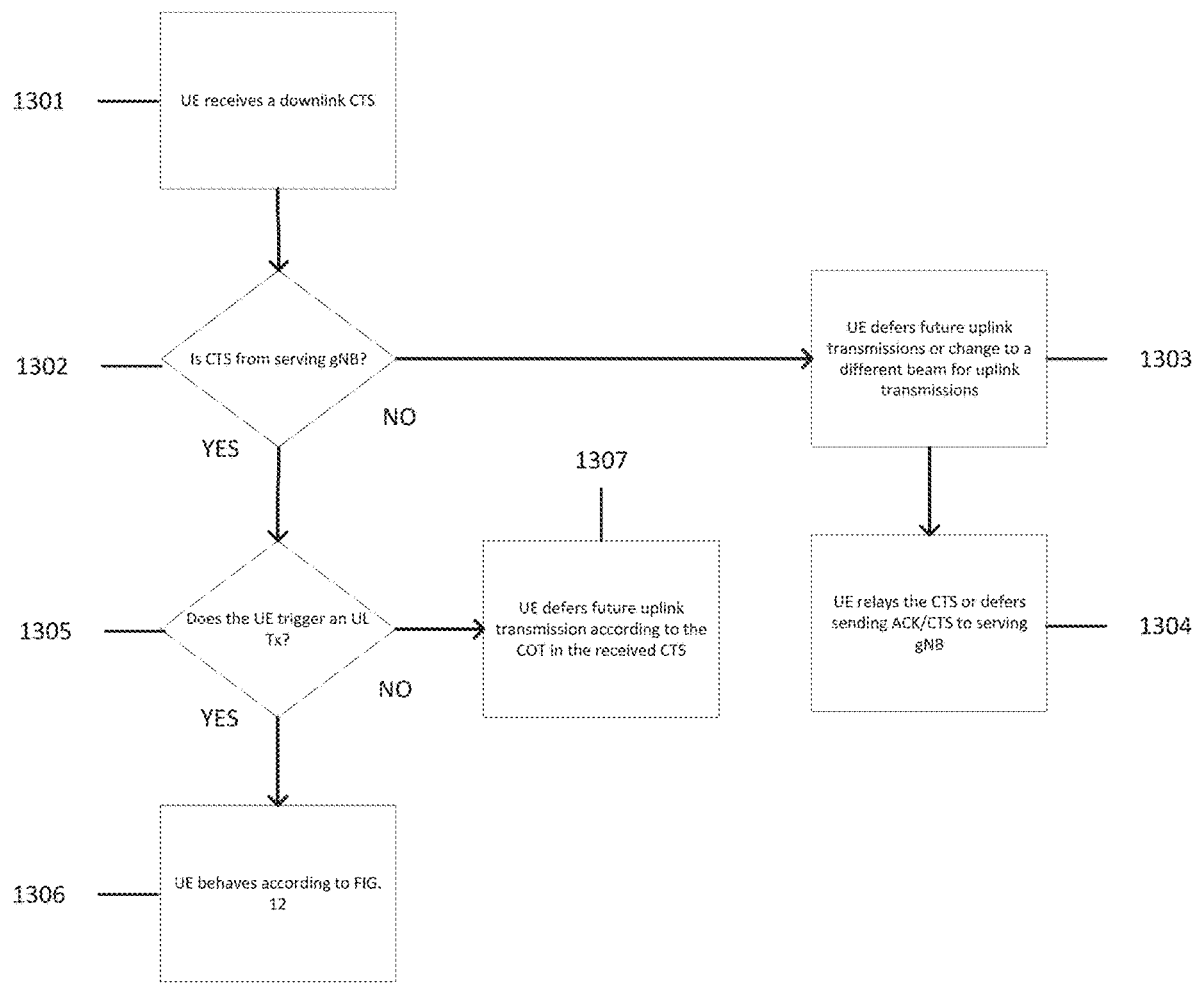
FIG. 13 is a flowchart illustrating UE behavior for UEs not involved in uplink transmission, according to an embodiment.

FIG. 13 is a flowchart illustrating UE behavior for UEs not involved in uplink transmission, according to an embodiment.

Referring to FIG. 13, in step 1301, a UE not involved in uplink transmission receives one or more CTS messages from its serving gNB and/or non-serving gNBs. The CTS may include the layer 2 UE ID of an active uplink transmission UE to differentiate different non-serving gNBs and the serving gNB.

When the UE receives a downlink CTS, it determines if the CTS is sent from its serving gNB in step 1302. The UE may make this determination by decoding the layer 2 UE ID of the active uplink transmission indicated in the CTS.

If the layer 2 UE ID does not belong to its serving cell, then this CTS comes from the non-serving gNB. In this case, in step 1303, this UE may defer a future uplink transmission if the received CTS indicates a given beam/TCI state for acquired COT duration which is the same as the beam that the UE intends to transmit its uplink data. The uplink transmission may be deferred until the indicated COT duration is complete. Alternatively, in step 1303, this UE may use another beam for its uplink transmission which is different than the beam for the acquired COT duration in the received CTS. In step 1304, the UE relays the received CTS information indicating a given beam/TCI state for the acquired COT duration to its serving gNB via a PUCCH or PUSCH after a successful LBT for uplink transmission. Alternatively in step 1304, the UE can defer sending an ACK/CTS to the serving gNB for the upcoming downlink transmission via the same beam as the one indicated in the received CTS from the non-serving gNB.

When the UE receives the CTS from the serving gNB in step 1302, it is determined whether the UE triggered the uplink transmission to its serving gNB in step 1305. If this UE was the UE that triggered the uplink transmission to its serving gNB, then in step 1306, the UE behaves according to the procedures in FIG. 12. Otherwise, in step 1307, the UE defers its future uplink transmission until the COT duration indicated in the received CTS expires.

Figure 14:
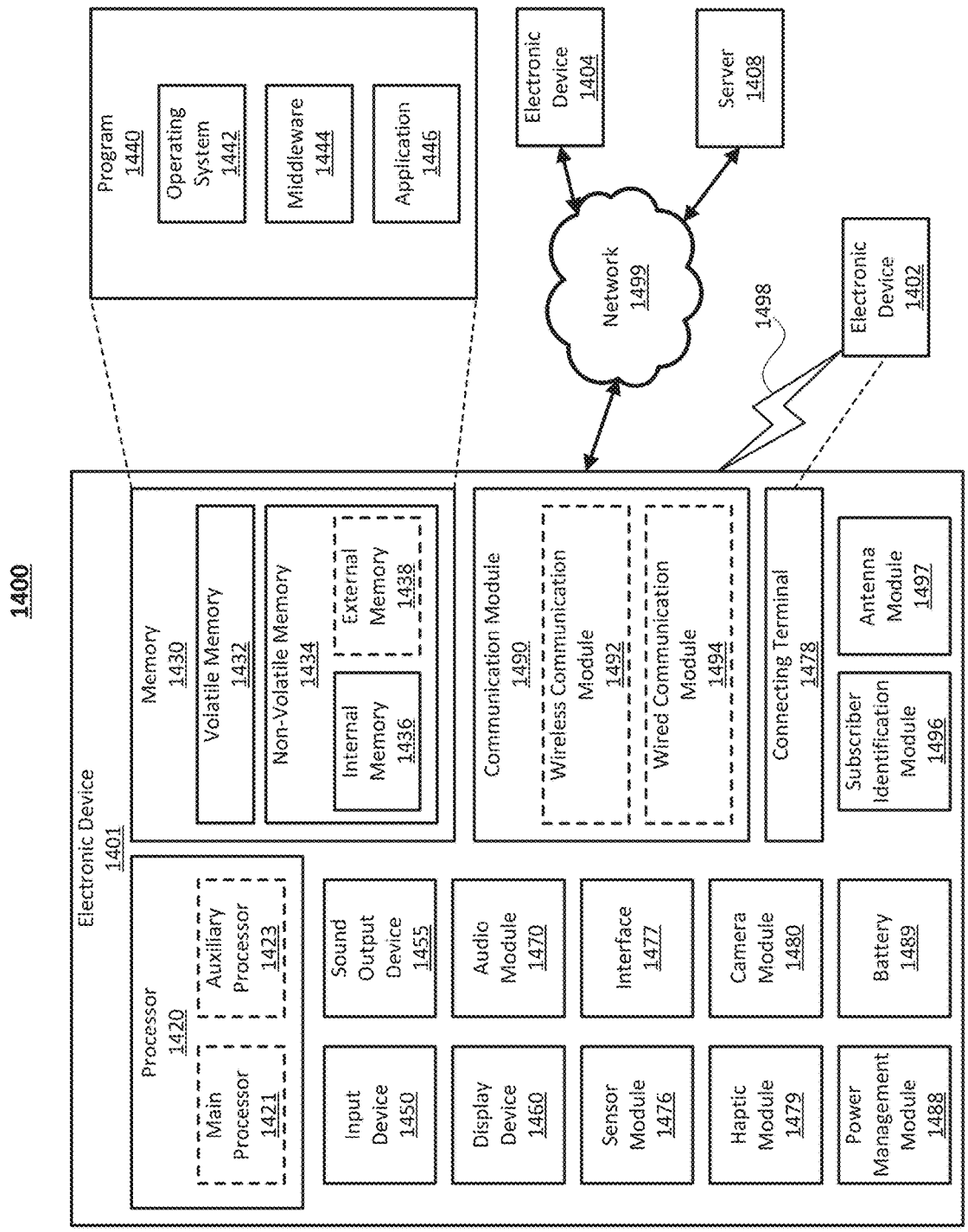
FIG. 14 illustrates an electronic device in a network environment, according to an embodiment.

FIG. 14 illustrates an electronic device in a network environment, according to an embodiment.

Referring to FIG. 14, the electronic device 1401, e.g., a mobile terminal including GPS functionality, in the network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497 including a GNSS antenna. In one embodiment, at least one (e.g., the display device 1460 or the camera module 1480) of the components may be omitted from the electronic device 1401, or one or more other components may be added to the electronic device 1401. In one embodiment, some of the components may be implemented as a single integrated circuit (IC). For example, the sensor module 1476 (e.g., a fingerprint sensor, an iris sensor, or an illuminance sensor) may be embedded in the display device 1460 (e.g., a display).

The processor 1420 may execute, for example, software (e.g., a program 1440) to control at least one other component (e.g., a hardware or a software component) of the electronic device 1401 coupled with the processor 1420, and may perform various data processing or computations. As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor, and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to one embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware PM, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to one embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to one embodiment, the audio module 1470 may obtain the sound via the input device 1450, or output the sound via the sound output device 1455 or a headphone of an external electronic device 1402 directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wiredly) or wirelessly. According to one embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. According to one embodiment, the connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. According to one embodiment, the haptic module 1479 may include, for example, a motor, a piezoelectric element, or an electrical stimulator.

The camera module 1480 may capture a still image or moving images. According to one embodiment, the camera module 1480 may include one or more lenses, image sensors, image signal processors, or flashes.

The power management module 1488 may manage power supplied to the electronic device 1401. The power management module 1488 may be implemented as at least part of, for example, a power management integrated circuit (PMIC).

The battery 1489 may supply power to at least one component of the electronic device 1401. According to one embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor) and supports a direct (e.g., wired) communication or a wireless communication. According to one embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to one embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

One embodiment may be implemented as software (e.g., the program 1440) including one or more instructions that are stored in a storage medium (e.g., internal memory 1436 or external memory 1438) that is readable by a machine (e.g., the electronic device 1401). For example, a processor of the electronic device 1401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A user equipment (UE), comprising:
a memory; and
a processor configured to:
perform directional listen before talk (LBT) to identify a set of narrow beam and sub-band combinations available for transmission;
transmit, to a base station (gNB), at least one schedule request in a physical uplink control channel (PUCCH) over the identified set of narrow beam and sub-band combinations;
receive, from the gNB, an uplink grant for physical uplink shared channel (PUSCH) data transmission over at least one narrow beam and sub-band combination selected by the gNB from the identified set of narrow beam and sub-band combinations; and
acquire a channel occupancy time (COT) duration for the at least one narrow beam and sub-band combination selected by the gNB as part of the uplink grant.

2. The UE of claim 1, wherein the processor is further configured to:
transmit, to the gNB, at least one uplink data transmission within the COT duration.

3. The UE of claim 1, wherein the at least one narrow beam and sub-band combination selected by the gNB is selected based on spectrum efficiency and traffic quality of service (QoS) requirements.

4. The UE of claim 1, wherein the processor is further configured to:
in a case in which no uplink grants are received, initiate a back-off timer to establish a contention window by selecting a random number in a uniform distribution from 0 to a maximum contention window size,
wherein the random number corresponds to a duration of the contention window.

5. The UE of claim 4, wherein the processor is further configured to:
double the contention window size up to the maximum contention window size if a specific PUSCH message is not received within the COT.

6. The UE of claim 4, wherein the processor is further configured to:
reset the contention window size to a predetermined minimum contention window size if a specific PUSCH message is received within the COT.

7. The UE of claim 4, wherein within the COT duration, hybrid automatic repeat request (HARQ) feedback of data transmission does not affect the duration of the contention window.

8. The UE of claim 1, wherein information related to the COT is transmitted to the gNB as part of buffer status reporting (BSR) information or as dedicated uplink control information (UCI).

9. A user equipment (UE), comprising:
a memory; and
a processor configured to:
perform directional listen before talk (LBT) to identify a set of narrow beam and sub-band combinations available for transmission;
transmit, to a base station (gNB), at least one request to send (RTS) message in a physical uplink control channel (PUCCH) over the identified set of narrow beam and sub-band combinations;
receive, from the gNB, a downlink control information (DCI) message over at least one narrow beam and sub-band combination selected by the gNB from the identified set of narrow beam and sub-band combinations; and
in response to receiving the DCI message, acquire a channel occupancy time (COT) duration for the at least one narrow beam and sub-band combination selected by the gNB.

10. The UE of claim 9, wherein the processor is further configured to:
transmit, to the gNB, at least one uplink data transmission within the COT duration,
wherein each uplink data transmission within the COT duration is preceded by receiving, from the gNB, specific DCI information that includes a corresponding DCI message.

11. The UE of claim 10, wherein the specific DCI information including the corresponding DCI message is periodically received within the COT duration.

12. The UE of claim 10, wherein the specific DCI information including the corresponding DCI message indicate, to the UE, that an interference condition at the gNB is acceptable for the UE to perform an uplink data transmission.

13. The UE of claim 10, wherein in a case in which the UE does not receive the specific DCI information including the corresponding DCI message within the COT duration, the UE skips a corresponding uplink data transmission.

14. The UE of claim 9, wherein the at least one narrow beam and sub-band combination selected by the gNB is selected based on spectrum efficiency and traffic quality of service (QoS) requirements.

15. The UE of claim 9, wherein the processor is further configured to:
in a case in which a specific DCI message is not received, initiate a back-off timer to establish a contention window by selecting a random number in a uniform distribution from 0 to a maximum contention window size.

16. The UE of claim 15, wherein the processor is further configured to:
double the contention window size up to the maximum contention window size if the specific DCI message is not received within the COT.

17. The UE of claim 15, wherein the processor is further configured to:
reset the contention window size to a predetermined minimum contention window size if the specific DCI message is received within the COT.

18. The UE of claim 15, wherein within the COT duration, hybrid automatic repeat request (HARQ) feedback of data transmission does not affect the duration of the contention window.

19. A base station (gNB), comprising:
a memory; and
a processor configured to:
perform directional listen before talk (LBT) to identify a set of narrow beam and sub-band combinations available for transmission;
transmit, to a user equipment (UE), downlink control information (DCI) in a physical downlink control channel (PDCCH) over the identified set of narrow beam and sub-band combinations;
receive, from the UE, an interference measurement for at least one narrow beam and sub-band combination included in the set of narrow beam and sub-band combinations;
select a final narrow beam and sub-band combination included in the set of narrow beam and sub-band combinations based on the interference measurement; and
acquire a channel occupancy time (COT) duration for data transmission for the selected final narrow beam and sub-band combination.

20. The gNB of claim 19, wherein the selected final narrow beam and sub-band combination is selected based on spectrum efficiency and traffic quality of service (QoS) requirements.

* * * * *